United States Patent
Yang et al.

(10) Patent No.: US 12,309,697 B2
(45) Date of Patent: May 20, 2025

(54) METHOD AND DEVICE FOR SENDING GROUP WAKE-UP SIGNAL

(71) Applicant: ZTE Corporation, Shenzhen (CN)

(72) Inventors: Weiwei Yang, Shenzhen (CN); Bo Dai, Shenzhen (CN); Kun Liu, Shenzhen (CN); Youjun Hu, Shenzhen (CN); Luanjian Bian, Shenzhen (CN); Huiying Fang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 218 days.

(21) Appl. No.: 17/422,359

(22) PCT Filed: Jan. 10, 2020

(86) PCT No.: PCT/CN2020/071508
§ 371 (c)(1),
(2) Date: Jul. 12, 2021

(87) PCT Pub. No.: WO2020/143789
PCT Pub. Date: Jul. 16, 2020

(65) Prior Publication Data
US 2022/0078708 A1 Mar. 10, 2022

(30) Foreign Application Priority Data
Jan. 11, 2019 (CN) .......................... 201910028409.7

(51) Int. Cl.
*H04W 52/02* (2009.01)
*H04W 68/00* (2009.01)

(52) U.S. Cl.
CPC ... *H04W 52/0219* (2013.01); *H04W 52/0216* (2013.01); *H04W 52/0229* (2013.01); *H04W 68/005* (2013.01)

(58) Field of Classification Search
CPC ......... H04W 52/0219; H04W 52/0216; H04W 52/0229; H04W 68/005; H04W 72/30;
(Continued)

(56) References Cited

U.S. PATENT DOCUMENTS

| | | |
|---|---|---|
| 2018/0020409 A1 | 1/2018 | Aboul-Magd et al. |
| 2018/0270756 A1 | 9/2018 | Bhattad et al. |

(Continued)

FOREIGN PATENT DOCUMENTS

| | | |
|---|---|---|
| CN | 105165074 A | 12/2015 |
| CN | 108632789 A | 10/2018 |

(Continued)

OTHER PUBLICATIONS

International Search Report for corresponding application PCT/CN2020/071508 filed Jan. 10, 2020; Mail date Apr. 8, 2020.
(Continued)

*Primary Examiner* — Michael K Phillips
(74) *Attorney, Agent, or Firm* — CANTOR COLBURN LLP

(57) ABSTRACT

Provided are a method and device for sending a group Wake-Up Signal (WUS). The method includes: configuring, by a base station, indication information corresponding to a group WUS via higher-layer signalling; determining, by the base station, a first parameter according to the indication information; and sending, by the base station, the group WUS to a terminal according to the first parameter, wherein the group WUS is a WUS corresponding to a group of terminals; the indication information includes at least one of: the number of groups, a location parameter, multiplexing information, a threshold, signal set information, a group index set, and a sequence set index; and the first parameter includes at least one of: a resource location corresponding to a group WUS, an all-wake-up signal corresponding to each
(Continued)

group, and a sending sequence corresponding to the group WUS.

19 Claims, 2 Drawing Sheets

(58) Field of Classification Search
CPC ... H04W 52/028; H04W 76/28; H04W 68/00; H04W 72/23; H04W 72/0446; H04W 72/0453; H04W 68/02; Y02D 30/70
See application file for complete search history.

(56) References Cited

U.S. PATENT DOCUMENTS

| | | | |
|---|---|---|---|
| 2018/0310249 A1 | 10/2018 | Wilhelmsson et al. | |
| 2018/0332549 A1 | 11/2018 | Bhattad et al. | |
| 2018/0359704 A1 | 12/2018 | Li | |
| 2019/0312758 A1* | 10/2019 | Liu | H04L 5/0048 |
| 2019/0349856 A1* | 11/2019 | Liu | H04W 72/0453 |
| 2020/0029302 A1* | 1/2020 | Cox | H04W 68/02 |
| 2020/0053645 A1* | 2/2020 | Charbit | H04W 76/28 |
| 2020/0107267 A1* | 4/2020 | Wu | H04W 52/0219 |
| 2020/0229095 A1* | 7/2020 | Shrestha | H04W 8/08 |
| 2020/0396687 A1* | 12/2020 | Hwang | H04W 4/80 |
| 2021/0297987 A1* | 9/2021 | Hwang | H04W 52/0235 |
| 2021/0306951 A1* | 9/2021 | Hwang | H04W 52/0235 |
| 2021/0314869 A1* | 10/2021 | Ye | H04J 13/00 |
| 2021/0329553 A1* | 10/2021 | Åström | H04W 4/80 |
| 2021/0345245 A1* | 11/2021 | Li | H04L 5/0053 |
| 2022/0046542 A1* | 2/2022 | Hwang | H04B 7/0613 |
| 2022/0095226 A1* | 3/2022 | Chang | H04W 52/0229 |

FOREIGN PATENT DOCUMENTS

| | | |
|---|---|---|
| CN | 108702707 A | 10/2018 |
| WO | 2018140080 A1 | 8/2018 |
| WO | 2018174635 A1 | 9/2018 |

OTHER PUBLICATIONS

European Search Report for corresponding application EP20738189; Report dated May 30, 2022.
Intel Corporation , "UE-group wake-up signal for eMTC", 3GPP TSG RAN WG1 Meeting #94bis, Chengdu, China, Oct. 8-12, 2018, R1-1810736.
Samsung. "UE-group wake-up signal for eMTC", 3GPP TSG RAN WG1 Meeting #95, Spokane, USA, Nov. 12-16, 2018, R1-1812939.
European Office Action for Application No. 20738189.8, dated Jan. 31, 2025, 9 pages.
Intel Corporation. "Analysis of impact of Wake-up signaling on power consumption and resource efficiency for efeMTC," 3GPP TSG RAN WG1 Meeting #89, R1-1707315, May 19, 2017, 7 pages.
Intel Corporation. "Configurations of Wake-up Signal for feNB-IoT," 3GPP TSG RAN WG1 Meeting #90bis, R1-1717344, Oct. 13, 2017, 4 pages.
Mediatek Inc. "UE Group Wake-up Signal for NB-IoT," 3GPP TSG-RAN WG2 Meeting #103bis, R2-1813719, Oct. 12, 2018, 4 pages.
Mediatek Inc. "UE Group Wake-up Signal in NB-IoT," 3GPP TSG-RAN WG2 Meeting #104, R2-1816956, Nov. 16, 2018, 5 pages.
Qualcomm Incorporated. "Discussion on UE-Group Wake-up Signal for MTC," 3GPP TSG RAN WG1 Meeting #94, R1-1809022, Aug. 24, 2018, 5 pages.
Supplementary Search Report for Chinese Application No. 2019100284097, dated Nov. 25, 2022, 4 pages.
Supplementary Search Report for Chinese Application No. 2019100284097, dated Sep. 17, 2023, 6 pages.

* cited by examiner

METHOD AND DEVICE FOR SENDING GROUP WAKE-UP SIGNAL

CROSS-REFERENCE TO RELATED APPLICATION

This application is a national stage filing of PCT International Application No. PCT/CN2020/071508 filed on Jan. 10, 2020, which claims priority to Chinese Patent Application No. 201910028409.7, filed with the China National Intellectual Property Administration on Jan. 11, 2019, the disclosure of which is incorporated herein by reference in its entirety.

TECHNICAL FIELD

The present disclosure relates to the field of communications, and in particular, to a method and device for sending a group Wake-Up Signal (WUS).

BACKGROUND

Machine Type Communications (MTC), also known as Machine to Machine (M2M) communication, is a main application form of the Internet of Things at the present stage. MTC devices currently deployed in the market are mainly based on a Global System of Mobile communication (GSM) system. In recent years, due to high spectrum efficiency of Long Term Evolution (LTE)/Long Term Evolution Advanced (LTE-Advanced, LTE-A), more and more mobile communication operators select the LTE/LTE-A as an evolution direction of a future broadband wireless communication system. Multiple types of data services of the MTC based on the LTE/LTE-A would also be more attractive.

Several technologies applicable to a Comb-Internet Of Things (C-IOT) are specified in a 3rd Generation Partnership Project (3GPP) Technical Report TR45.820V200, and a Narrow Bang-Internet Of Things (NB-IoT) technology is the most attractive. The NB-IOT system focuses on radio frequency access technologies with low complexity and low throughput, and the main research targets include: improved indoor coverage, support of mass terminals with low throughput, low delay sensitivity, ultralow equipment cost, low equipment power loss, and network architecture.

The network can send paging to a terminal (also referred to as User Equipment (UE)) in an idle state and a connected state. The paging procedure may be triggered by a core network to notify a certain terminal to receive a paging request, and may alternatively be triggered by an Evolved Node B (eNB) to notify an update of system information. The paging message is scheduled using physical downlink control information (Physical Downlink Control Channel, PDCCH) scrambled by a P-Radio Network Temporary Identifier (RNTI), and is transmitted on a Physical Downlink Shared Channel (PDSCH). A terminal detects a corresponding PDCCH at a Paging Occasion (PO) so as to determine whether a PDSCH indicated by the PDCCH bears a paging message. If the terminal does not detect the corresponding PDCCH at the PO, it means that there is no paging message at the PO, and in such a case, the terminal transits into a sleep state and does not receive data until the arrival of the next PO, at which the detection is performed again. This mechanism is referred to as Discontinuous Reception (DRX), in which the UE needs to perform blind detection for the PDCCH at each PO, and thus the power consumption of the UE is high.

Aiming at the described technical problem, no effective solution has been proposed in the related art.

SUMMARY

Embodiments of the present disclosure provide a method and device for sending a group WUS, which may at least solve the problem in the related art that the power consumption of a terminal for detecting a PDCCH is relatively high.

According to some embodiments of the present disclosure, provided is a method for sending a group WUS, including the following operations: a base station configures indication information corresponding to a group WUS via higher-layer signalling; the base station determines a first parameter according to the indication information; and the base station sends the group WUS according to the first parameter, wherein the group WUS is a WUS corresponding to a group of terminals. The indication information includes at least one of: the number of groups, a location parameter, multiplexing information, a threshold, signal set information, a group index set, and a sequence set index. The first parameter includes at least one of: a resource location corresponding to the group WUS, an all-wake-up signal corresponding to each group, and a sequence corresponding to the group WUS.

According to some other embodiments of the present disclosure, provided is a method for detecting a physical downlink control channel, including the following operations: a terminal determines a first parameter of a group WUS according to indication information obtained via higher-layer signalling; the terminal receives and detects the group WUS according to the first parameter; and the terminal determines whether to detect a physical downlink control channel according to a detection result. The indication information includes at least one of: the number of groups, a location parameter, multiplexing information, a threshold, signal set information, a group index set, and a sequence set index. The first parameter includes at least one of: a resource location corresponding to the group WUS, a corresponding all-wake-up signal, and a sequence corresponding to the group WUS.

According to some other embodiments of the present disclosure, provided is a device for sending a group WUS, including: a configuration module, configured to configure indication information corresponding to a group WUS via higher-layer signalling; a first determination module, configured to determine a first parameter according to the indication information; and a sending module, configured to send the group WUS according to the first parameter, wherein the group WUS is a WUS corresponding to a group of terminals. The indication information includes at least one of: the number of groups, a location parameter, multiplexing information, a threshold, signal set information, a group index set, and a sequence set index. The first parameter includes at least one of: a sequence corresponding to the group WUS, an all-wake-up signal corresponding to each group, and a sequence corresponding to the group WUS.

According to some other embodiments of the present disclosure, provided is a device for detecting a physical downlink control channel, including: a second determination module, configured to determine, according to indication information obtained via higher-layer signalling, a first parameter of a group WUS; a processing module, configured to receive and detect the group WUS based on the first parameter; and a third determination module, configured to determine whether to detect a physical downlink control channel according to a detection result. The indication information includes at least one of: the number of groups, a location parameter, multiplexing information, a threshold, signal set information, a group index set, and a sequence set index. The first parameter includes at least one of: a resource location corresponding to the group WUS, a corresponding all-wake-up signal, and a sequence corresponding to the group WUS.

According to some other embodiments of the present disclosure, provided is a storage medium storing a computer program, wherein the computer program is configured to execute the operations in any one of the described method embodiments at runtime.

According to some other embodiments of the present disclosure, provided is an electronic device, including a memory and a processor, wherein the memory stores a computer program, and the processor is configured to run the computer program to execute the operations in any one of the described method embodiments.

By means of the embodiments of the present disclosure, a base station configures indication information corresponding to a group WUS via higher-layer signalling, determines a first parameter according to the indication information, and sends the group WUS to a terminal according to the first parameter, wherein the group WUS is a WUS corresponding to a group of terminals. The indication information includes at least one of: the number of groups, a location parameter, multiplexing information, a threshold, signal set information, a group index set, and a sequence set index. The first parameter includes at least one of: a resource location corresponding to a group WUS, an all-wake-up signal corresponding to each group, and a sequence corresponding to the group WUS. After receiving the indication information, a terminal receives and detects the group WUS based on the first parameter determined by the indication information, which can reduce the number of times that the terminal unnecessarily detects an PDCCH. Therefore, the problem in the related art that the power consumption of a terminal for detecting a PDCCH is relatively high can be solved, and the effect of reducing the terminal consumption can be achieved.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings.

DETAILED DESCRIPTION OF THE EMBODIMENTS

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

Figure 1:
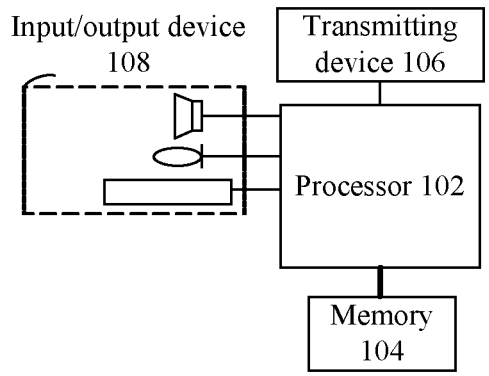
FIG. 1 is a hardware structural block diagram of a mobile terminal for implementing a method for detecting a physical downlink control channel according to some embodiments of the present disclosure.

The method embodiments provided in the embodiments of the present disclosure may be executed in a mobile terminal, a computer terminal, or a similar computing device. Taking operation on a mobile terminal as an example, FIG. 1 is a hardware structural block diagram of a mobile terminal for implementing a method for detecting a physical downlink control channel according to some embodiments of the present disclosure. As shown in FIG. 1, a mobile terminal 10 may include one or more (only one is shown in FIG. 1) processors 102 (the processors 102 may include, but are not limited to, processing devices such as a Micro Control Unit (MCU) or a Field Programmable Gate Array (FPGA)) and a memory 104 for storing data. In some exemplary embodiments, the mobile terminal may further include a transmitting device 106 and an input/output device 108 for a communication function. A person having ordinary skill in the art may understand that the structure shown in FIG. 1 is merely exemplary, and does not limit the structure of the foregoing mobile terminal. For example, the mobile terminal 10 may include more or fewer components than shown in FIG. 1, or have a different configuration than that shown in FIG. 1.

The memory 104 may be configured to store a computer program, for example, software programs and modules of application software, such as a computer program corresponding to the method for detecting a physical downlink control channel in the embodiments of the present disclosure. The processor 102 runs the computer program stored in the memory 104, so as to execute various function applications and data processing, that is, to implement the foregoing method. The memory 104 may include high-speed random access memory, and may also include non-volatile memory, such as one or more magnetic storage devices, flash memory, or other non-volatile solid-state memory. In some instances, the memory 104 may further include memory remotely located from the processor 102, and may be connected to the mobile terminal 10 over a network. Examples of such networks include, but are not limited to, the Internet, intranets, local area networks, mobile communication networks, and combinations thereof.

The transmitting device 106 is configured to receive or send data via a network. Exemplary implementations of the described network may include a wireless network provided by a communication provider of the mobile terminal 10. In one example, the transmitting device 106 may include a Network Interface Controller (NIC) that may be coupled to other network devices via a base station to communicate with the Internet. In one example, the transmitting device 106 may be a Radio Frequency (RF) module for communicating wirelessly with the Internet.

Figure 2:
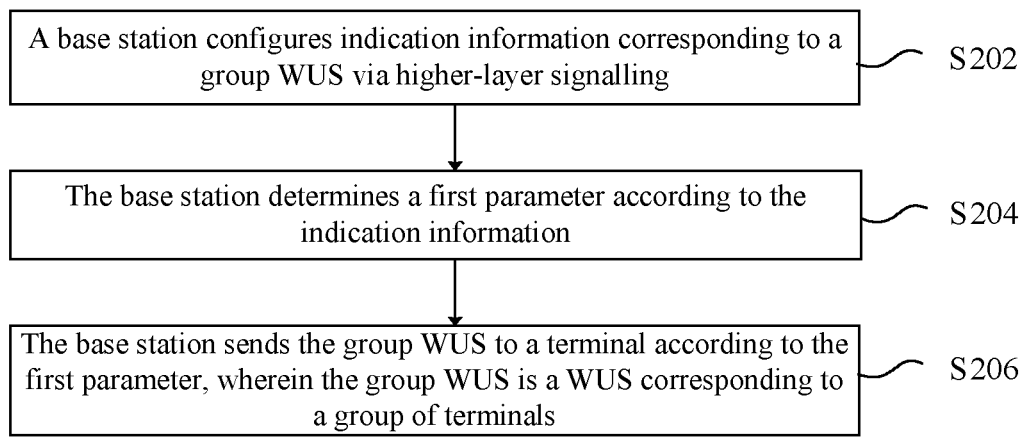
FIG. 2 is a flowchart of a method for sending a group WUS according to some embodiments of the present disclosure.

Provided in some embodiments of the present disclosure is a method for sending a group WUS. FIG. 2 is a flowchart of a method for sending a group WUS according to some embodiments of the present disclosure. As shown in FIG. 2, the flow includes the following operations.

At S202, a base station configures indication information corresponding to a group WUS via higher-layer signalling.

At S204, the base station determines a first parameter according to the indication information.

At S206, the base station sends the group WUS to a terminal according to the first parameter, wherein the group WUS is a WUS corresponding to a group of terminals.

In the embodiments, the indication information includes at least one of: the number of groups, a location parameter, multiplexing information, a threshold, signal set information, a group index set, and a sequence set index. The first parameter includes at least one of: a resource location corresponding to a group WUS, an all-wake-up signal corresponding to each group, and a sequence corresponding to the group WUS.

By means of the embodiments of the present disclosure, a base station configures indication information corresponding to a group WUS via higher-layer signalling, determines a first parameter according to the indication information, and sends the group WUS to a terminal according to the first parameter, wherein the group WUS is a WUS corresponding to a group of terminals. The indication information includes at least one of: the number of groups, a location parameter, multiplexing information, a threshold, signal set information, a group index set, and a sequence set index. The first parameter includes at least one of: a resource location corresponding to a group WUS, an all-wake-up signal corresponding to each group, and a sequence corresponding to the group WUS. The terminal receives the group WUS based on the first parameter after receiving the first parameter, which can reduce the number of times that the terminal unnecessarily detects a PDCCH. Therefore, the problem in the related art that the power consumption of a terminal for detecting a PDCCH is relatively high can be solved, and the effect of reducing the terminal consumption can be achieved.

In some exemplary implementations, the entity for executing of the foregoing operations may be, but is not limited to, a base station.

In some exemplary implementations, the resource location corresponding to the group WUS may include at least one of a first location and a second location. In the embodiments, the first location and the second location are resource locations of the group WUS.

In some exemplary implementations, the all-wake-up signal includes at least one of: a legacy WUS, and a common WUS. In the embodiments, the all-wake-up signal is a signal used for waking up all terminals corresponding to the all-wake-up signal to perform PDCCH detection, and the legacy WUS refers to a WUS in the related art.

In some exemplary implementations, in cases where the indication information includes the number of groups, the number of groups includes at least one of: the number of groups corresponding to the terminal at a PO corresponding to the group WUS; the number of terminal groups corresponding to the same time-frequency resource location; and the number of terminal groups corresponding to the same time domain resource location. In the embodiments, the number of groups is determined based on PO.

In some exemplary implementations, in cases where the indication information includes the location parameter, the location parameter may include at least one of: a first offset; a second offset; and a start physical resource block index of a second frequency domain location. The first offset includes one of: a time domain distance between an end location of a second location and a start location of a first location; a time domain distance between an end location of a second location and an end location of a first location; or a time domain distance between an end location of a second location and a start location of a search space of a physical downlink control channel. The second offset includes the number of physical resource blocks between the second frequency domain location and a first frequency domain location.

In some exemplary implementations, in cases where the indication information includes the multiplexing information, the multiplexing information may include at least one of: a first multiplexing mode; a second multiplexing mode; a third multiplexing mode; and a fourth multiplexing mode. The first multiplexing mode is a multiplexing mode in which the resource location corresponding to the group WUS is a first location, and the all-wake-up signal is a legacy WUS; the second multiplexing mode is a multiplexing mode in which the resource location corresponding to the group WUS and the all-wake-up signal are determined based on a group index; the third multiplexing mode is a multiplexing mode in which the resource location corresponding to the group WUS is a second location, and the all-wake-up signal is a common WUS; the fourth multiplexing mode is a multiplexing mode in which the resource location corresponding to the group WUS is a first location or a second location, and the all-wake-up signal is a legacy WUS or a common WUS.

In some exemplary implementations, in cases where the indication information includes the group index set, the group index set includes at least one of: a set of group indices corresponding to groups for which the corresponding all-wake-up signal is a common WUS; a set of group indices corresponding to groups for which the corresponding all-wake-up signal is a legacy WUS; a set of group indices corresponding to groups for which the corresponding resource location is a first location; and a set of group indices corresponding to groups for which the corresponding resource location is a second location.

In some exemplary implementations, in cases where the indication information includes the signal set information, the signal set information includes information of WUS of each group, or information of WUS of all groups, wherein the information of WUS of each group includes a common WUS or a legacy WUS, and the information of WUS of all groups includes a common WUS or a legacy WUS.

In some exemplary implementations, in cases where the indication information includes the sequence set index, the sequence set index includes an index corresponding to a subset in a preset sequence set, wherein the preset sequence set is predefined, or the preset sequence set is determined based on at least one of: a resource location, a multiplexing relationship, the number of groups, and the number of sequences.

In some exemplary implementations, the operation that the base station determines the first parameter according to the indication information includes: in cases where the indication information includes the number of groups, the base station determines the first parameter at least according to the number of groups and a preset threshold.

In some exemplary implementations, the operation that the base station determines the first parameter according to the indication information includes: in cases where the indication information includes the location parameter, the base station determines the first parameter at least according to a second location determined by the location parameter and a location of a legacy WUS.

In some exemplary implementations, the operation that the base station determines the first parameter according to the indication information includes: in cases where the indication information includes the multiplexing parameter, the base station determines the first parameter at least according to a multiplexing mode included in the multiplexing information.

In some exemplary implementations, the operation that the base station determines the first parameter according to the indication information includes: in cases where the indication information includes the threshold, the base station determines the first parameter at least according to each group index and the threshold, or the base station determines the first parameter at least according to the number of groups and the threshold.

In some exemplary implementations, the operation that the base station determines the first parameter according to the indication information includes: in cases where the indication information includes the signal set information, the base station determines the first parameter at least according to a signal included in the signal set information.

In some exemplary implementations, the operation that the base station determines the first parameter according to the indication information includes: in cases where the indication information includes the group index set, the base station determines the first parameter at least according to group information indicated in the group index set.

In some exemplary implementations, the operation that the base station determines the first parameter according to the sequence set index includes: in cases where the indication information includes the sequence set index, the base station determines the first parameter at least according to a subset in the sequence set indicated by the sequence set index.

Figure 3:
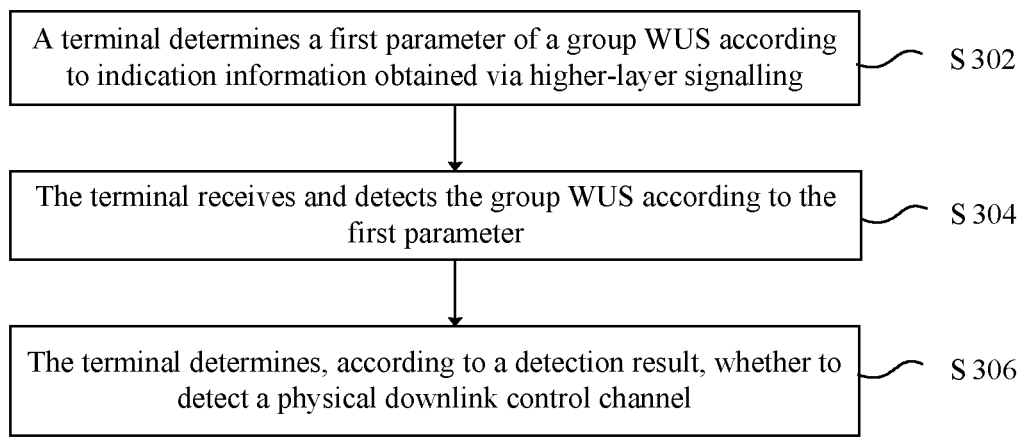
FIG. 3 is a flowchart of a method for detecting a physical downlink control channel according to some embodiments of the present disclosure.

A method for detecting a physical downlink control channel is provided in some embodiments of the present disclosure. FIG. 3 is a flowchart of a method for detecting a physical downlink control channel according to some embodiments of the present disclosure. As shown in FIG. 3, the flow includes the following operations.

At S302, a terminal determines a first parameter of a group WUS according to indication information obtained via higher-layer signalling:

At S304: the terminal receives and detects the group WUS according to the first parameter:

At S306, the terminal determines whether to detect a physical downlink control channel according to a detection result.

In the embodiments, the indication information includes at least one of: the number of groups, a location parameter, a multiplexing mode, a threshold, signal set information, a group index set, and a sequence set index. The first parameter includes at least one of: a resource location corresponding to the group WUS, a corresponding all-wake-up signal, and a sequence corresponding to the group WUS.

By means of the embodiments of the present disclosure, a terminal determines a first parameter of a group WUS according to indication information obtained via higher-layer signalling, then receives and detects the group WUS according to the first parameter, and determines whether to detect a physical downlink control channel according to a detection result. The terminal can receive the group WUS based on the first parameter after receiving the first parameter, thereby reducing the number of times that the terminal unnecessarily detect the PDCCH. Therefore, the problem in the related art that the power consumption of a terminal for detecting a PDCCH is relatively high can be solved, thereby achieving the effect of reducing terminal consumption.

In some exemplary implementations, the entity for executing the foregoing operations may be a terminal, but is not limited thereto.

In some exemplary implementations, the resource location corresponding to the group WUS may include at least one of a first location and a second location.

In some exemplary implementations, the all-wake-up signal includes at least one of: a legacy WUS, and a common WUS. The all-wake-up signal is a signal used for waking up all terminals corresponding to the all-wake-up signal to perform PDCCH detection, and the legacy WUS refers to a WUS in the related art.

In some exemplary implementations, the operation that the terminal determines the first parameter of the group WUS according to the indication information obtained via the higher-layer signalling includes: in cases where the indication information includes the number of groups, the terminal determines the first parameter at least according to the number of groups and a preset threshold.

In some exemplary implementations, the operation that the terminal determines the first parameter of the group WUS according to the indication information obtained via the higher-layer signalling includes: in cases where the indication information includes the location parameter, the terminal determines the first parameter at least according to a second location determined by the location parameter and a resource location of a legacy WUS.

In some exemplary implementations, the second location is determined according to a first location and the location parameter, wherein the location parameter includes at least one of: a first offset, a second offset, and a start physical resource block index of a second frequency domain location. The first offset includes one of the following: a time domain distance between an end location of a second location and a start location of a first location, a time domain distance between an end location of a second location and an end location of a first location, and a time domain distance between an end location of a second location and a start location of a search space of a physical downlink control channel. The second offset includes the number of physical resource blocks between the second frequency domain location and a first frequency domain location.

In some exemplary implementations, in cases where the indication information includes the multiplexing information, the operation that the terminal determines the first parameter of the group WUS according to the indication information obtained via the higher-layer signalling includes: the terminal determines the first parameter at least according to a multiplexing mode included in the multiplexing information.

In some exemplary implementations, the multiplexing information may include at least one of: a first multiplexing mode; a second multiplexing mode; a third multiplexing mode; and a fourth multiplexing mode. The first multiplexing mode is a multiplexing mode in which the resource location corresponding to the group WUS is a first location, and the all-wake-up signal is a legacy WUS; the second multiplexing mode is a multiplexing mode in which the resource location corresponding to the group WUS and the all-wake-up signal are determined based on a group index; the third multiplexing mode is a multiplexing mode in which the resource location corresponding to the group WUS is a second location, and the all-wake-up signal is a common WUS; and the fourth multiplexing mode is a multiplexing mode in which the resource location corresponding to the group WUS is a first location or a second location, and the all-wake-up signal is a legacy WUS or a common WUS.

In some exemplary implementations, the operation that the terminal determines the first parameter of the group WUS according to the indication information obtained via the higher-layer signalling includes: in cases where the indication information includes the threshold, the terminal determines the first parameter at least according to a group index corresponding to the terminal and the threshold, or the terminal determines the first parameter at least according to the number of groups and the threshold.

In some exemplary implementations, the operation that the terminal determines the first parameter of the group WUS according to the indication information obtained via the higher-layer signalling includes: in cases where the indication information includes the group index set, the terminal determines the first parameter at least according to a group index corresponding to the terminal and the group index set indicated by a base station.

In some exemplary implementations, the group index set includes at least one of: a set of group indices corresponding to groups for which the corresponding all-wake-up signal is a common WUS; a set of group indices corresponding to groups for which the corresponding all-wake-up signal is a legacy WUS; a set of group indices corresponding to groups for which the corresponding resource location is a first location; and a set of group indices corresponding to groups for which the corresponding resource location is a second location.

In some exemplary implementations, in cases where the indication information includes the signal set information, the operation that the terminal determines the first parameter of the group WUS according to the indication information obtained via the higher-layer signalling includes: the terminal determines the first parameter at least according to a signal included in the signal set information.

In some exemplary implementations, the signal set information is information of WUS of each group, or information of WUS of all groups, wherein the information of WUS of each group includes a common WUS or a legacy WUS, and the information of WUS of all groups includes a common WUS or a legacy WUS.

In some exemplary implementations, the operation that the terminal determines the first parameter of the group WUS according to the indication information obtained via the higher-layer signalling includes: in cases where the indication information includes the sequence set index, the terminal determines the first parameter at least according to a sequence set indicated by the sequence set index, wherein the sequence set index is an index corresponding to a subset in a preset sequence set.

In some exemplary implementations, the preset sequence set is a predefined sequence set, or the preset sequence set is determined based on at least one of: a resource location, a multiplexing relationship, the number of groups, and the number of sequences.

The present disclosure will be described below with reference to exemplary embodiments. The embodiments provide a method for sending and receiving a WUS.

Embodiment 1

Provided is a method for processing a group WUS. The flow includes the following operations.

At S1, a terminal determines, according to indication information indicated via higher-layer signalling, a first parameter corresponding to a group WUS.

At S2, the terminal receives and detects the group WUS at least according to the first parameter, and determines detection of a physical downlink control channel according to a detection result.

The indication information includes at least one of: the number of groups, a location parameter, multiplexing information, a threshold, signal set information, a group index set, and a sequence set index. The first parameter includes at least one of: a resource location corresponding to the group WUS, a corresponding all-wake-up signal, and a sequence corresponding to the group WUS.

Exemplary Embodiment 1

A terminal determines a first parameter corresponding to a group WUS according to a group number (i.e., the number of groups) indicated via higher-layer signalling. The first parameter is embodied as a resource location of a WUS and the all-wake-up signal corresponding to a group to which the terminal belongs. The resource location includes a first location and a second location, wherein the first location is a location of a legacy Wake-Up Signal (legacy WUS), and the second location is a location adjacent to the legacy WUS or is a preset location. The adjacent location includes an adjacent frequency domain location and/or an adjacent time domain location. The all-wake-up signal includes a first signal and a second signal, wherein the first signal is a legacy WUS, and the second signal is a common WUS (common WUS). The terminal receives and detects a WUS at least according to the first parameter, and determines detection of a physical downlink control channel according to a detection result.

Exemplary Implementation 1

In cases where the configured number of groups is less than a first threshold, the resource location of the WUS is the first location, and the all-wake-up signal of all groups is the first signal. In cases where the configured number of groups is greater than or equal to the first threshold, the resource location of the WUS is the second location, and the all-wake-up signal of all groups is the second signal.

Example 1

It is assumed that the first threshold is a preset value 4, and the number of groups indicated via the higher-layer signalling is 2. Since the number of groups is less than the first threshold, the resource location of WUS of all groups is the first location, i.e., the location of the legacy WUS, and the all-wake-up signal of all groups is also the legacy WUS.

The terminal of group 1 receives a WUS at the first location, and performs detection by using sequences corresponding to a WUS1 and the legacy WUS. In cases where any one of the WUS1 and the legacy WUS is detected, the terminal continues to detect a PDCCH; and in cases where none of the WUS1 and the legacy WUS is detected, the terminal does not detect the PDCCH. The WUS1 is the group WUS corresponding to group 1. The receiving and detecting processes may be implemented according to the related art, and are not repeated herein.

The terminal of group 2 receives a WUS at the first location, and performs detection by using sequences corresponding to a WUS2 and the legacy WUS. In cases where any one of the WUS2 and the legacy WUS is detected, the terminal continues to detect a PDCCH; and in cases where none of the WUS2 and the legacy WUS is detected, the terminal does not detect the PDCCH. The WUS2 is the group WUS corresponding to group2. The receiving and detecting processes may be implemented according to the related art, and are not repeated herein.

The terminal obtains a corresponding group WUS according to a group index.

Example 2

It is assumed that the first threshold is a preset value 4, and the configured number of groups is 4. Since the number of groups is greater than or equal to the first threshold, the resource location of the WUS is the second location, and the all-wake-up signal is correspondingly the common WUS. The details are shown in Table 1.

TABLE 1

| Second location | |
| --- | --- |
| Group 1 | WUS 1 |
| Group 2 | WUS 2 |
| Group 3 | WUS 3 |
| Group 4 | WUS 4 |
| All-wake-up signal for Group 1 and Group 2 | common WUS |

The terminal of group 1 receives a sent WUS at the second location, and performs detection by using sequences corresponding to a WUS1 and the common WUS. In cases where any one of the WUS1 and the common WUS is detected, the terminal continues to detect a PDCCH; and in cases where none of the WUS1 and the common WUS is detected, the terminal does not detect the PDCCH. The WUS1 is the group WUS corresponding to group 1.

The terminal of group 2 receives a sent WUS at the second location, and performs detection by using sequences corresponding to a WUS2 and the common WUS. In cases where any one of the WUS2 and the common WUS is detected, the terminal continues to detect a PDCCH; and in cases where none of the WUS2 and the common WUS is detected, the terminal does not detect the PDCCH. The WUS2 is the group WUS corresponding to group 2.

The terminal of group 3 receives a sent WUS at the second location, and performs detection by using sequences corresponding to a WUS3 and the common WUS. In cases where any one of the WUS3 and the common WUS is detected, the terminal continues to detect a PDCCH; and in cases where none of the WUS3 and the common WUS is detected, the terminal does not detect the PDCCH. The WUS3 is the group WUS corresponding to group 3.

The terminal of group 4 receives a sent WUS at the second location, and performs detection by using sequences corresponding to a WUS4 and the common WUS. In cases where any one of the WUS4 and the common WUS is detected, the terminal continues to detect a PDCCH; and in cases where none of the WUS4 and the common WUS is detected, the terminal does not detect the PDCCH. The WUS4 is the group WUS corresponding to group 4.

The terminal obtains a corresponding group WUS according to a group index.

Exemplary Implementation 2

In cases where the configured number of groups is less than a second threshold, the resource location of the WUS is the first location, the all-wake-up signal of all groups is the first signal. In cases where the number of groups is greater than or equal to the second threshold and is less than a third threshold, the resource location of the WUS is the second location, and the all-wake-up signal of all groups is the second signal. In cases where the number of groups is greater than or equal to the third threshold, the resource location of the WUS and the corresponding all-wake-up signal are determined at least according to a group index.

The operation that the resource location of the WUS and the corresponding all-wake-up signal is determined at least according to the group index may be implemented in the following manner: predefining a correspondence between the group index and the resource location, predefining a correspondence between the group index and the all-wake-up signal, and predefining a correspondence between the group index and both the resource location and the all-wake-up signal.

Example 1: a correspondence between the group index and the resource location is predefined. For example, assuming that the configured number of groups is N, then the resource location of the WUS with a group index of 0.1 . . . , N/2−1 is the first location, and the resource location of the WUS with a group index of N/2, . . . , N is the second location, and vice versa.

Example 2: a correspondence between the group index and the resource location is predefined. For example, assuming that the configured number of groups is N, the resource location of the WUS with an odd group index is the first location, and the resource location of the WUS with an even group index is the second location, and vice versa.

Example 3: a correspondence between the group index and the resource location is predefined. For example, assuming that the configured number of groups is N, in cases where a paging index is an odd number, the resource location of the WUS with a group index of 0, 1 . . . , N/2−1 is the first location, and the resource location of the WUS with a group index of N/2, . . . , N is the second location; in cases where the paging index is an even number, the resource location of the WUS with an odd group index is the first location, and the resource location of the WUS with an even group index is the second location.

Example 4: a correspondence between the group index and the all-wake-up signal is predefined. For example, assuming that the configured number of groups is N, the group index being 0, 1, . . . , N/2−1 corresponds to a legacy WUS, and the group index being N/2, . . . , N corresponds to a common WUS, and vice versa.

Example 5: a correspondence between the group index and the all-wake-up signal is predefined. For example, assuming that the configured number of groups is N, the group index being an odd number corresponds to a legacy WUS, and the group index being an even number corresponds to a common WUS, and vice versa.

Example 6: a correspondence between the group index and the all-wake-up signal is predefined. For example, assuming that the configured number of groups is N, in cases where a paging index is an odd number, the group index being 0.1 . . . , N/2−1 corresponds to a legacy WUS, and the group index being N/2 . . . , N corresponds to a common WUS; in cases where the paging index is an even number, the group index being an odd number corresponds to a legacy WUS, and the group index being an even number corresponds to a common WUS.

Example 7: a correspondence between the group index, the resource location and the all-wake-up signal is predefined. For example, assuming that the configured number of groups is N, the resource location of the WUS with an odd group index is the first location, the corresponding all-wakeup signal is a legacy WUS, the resource location of the WUS with an even group index is the second location, and the corresponding all-wake-up signal is a common WUS.

The above is only examples, and does not exclude other correspondence between the groups, the resource locations and the all-wake-up signal.

In the embodiments, the first threshold, the second threshold and the third threshold are preset thresholds, or are configured via higher-layer signalling.

Exemplary Embodiment 2

A terminal determines a first parameter corresponding to a WUS according to a location parameter indicated via higher-layer signalling. The first parameter is embodied as a resource location of the WUS and the all-wake-up signal corresponding to a group to which the terminal belongs. The location parameter indicates a second location. The all-wake-up signal includes a first signal and a second signal, wherein the first signal is a legacy WUS, and the second signal is a common WUS. The terminal receives and detects the WUS at least according to the first parameter, and determines detection of a physical downlink control channel according to a detection result. The location parameter is any one of the following:
- a time domain distance between an end location of the second location and a start location of the first location;
- a time domain distance between the end location of the second location and the end location of the first location;
- a time domain distance between the end location of the second location and a start location of a PDCCH search space;
- the number of physical resource blocks between the second location and the first location; or a start physical resource block index of the second location.

Exemplary Implementation 1

In cases where the second location and the resource location of the legacy WUS are the same, the all-wake-up signal corresponding to all groups is the legacy WUS. In cases where the second location and the resource location of the legacy WUS are different, the resource locations of all the WUSs are the second location, and the all-wake-up signal corresponding to all groups is the common WUS.

Example 1

In an NB-IoT system, assuming that a second time domain location is determined according to the location parameter, and the second time domain location is the same as a time domain location of the legacy WUS, the all-wake-up signal corresponding to all groups in this case is the legacy WUS.

Example 2

In an MTC system, assuming that a second frequency domain location is determined according to the location parameter, and the second frequency domain location is the same as a frequency domain location of the legacy WUS, the all-wake-up signal corresponding to all groups in this case is the legacy WUS.

Example 3

In an MTC system, assuming that a second time-frequency domain location is determined according to the location parameter, and the second time-frequency domain location is the same as a time-frequency domain location of the legacy WUS, the all-wake-up signal corresponding to all groups is the legacy WUS.

Exemplary Implementation 2

In cases where the second location and the location of the legacy WUS are the same, the all-wake-up signal corresponding to the WUS is a common WUS. In cases where the second location and the location of the legacy WUS are different, the resource location of the WUS and the all-wake-up signal are determined at least according to a group index corresponding to the terminal. Details are as described in exemplary implementation 2.

Exemplary Embodiment 3

A terminal determines a first parameter corresponding to a WUS according to the number of groups and a location parameter indicated via higher-layer signalling. The first parameter is embodied as a resource location of the WUS and the all-wake-up signal corresponding to a group to which the terminal belongs. A second location is determined according to the location parameter. The all-wake-up signal includes a first signal and a second signal, wherein the first signal is a legacy WUS, and the second signal is a common WUS. The terminal receives and detects a WUS at least according to the first parameter, and determines detection of a physical downlink control channel according to a detection result.

Exemplary Implementation 1

The second location is the same as the location of the legacy WUS, the all-wake-up signal corresponding to all groups is the legacy WUS. Alternatively, in cases where the second location is the same as the location of the legacy WUS and the number of groups is less than a fourth threshold, the all-wake-up signal corresponding to all groups is the legacy WUS; and in cases where the second location is the same as the location of the legacy WUS, and the number of groups is greater than or equal to the fourth threshold, the all-wake-up signal corresponding to all groups is the common WUS.

Exemplary Implementation 2

In cases where the second location is different from the location of the legacy WUS, and the number of groups is less than or equal to a fifth threshold, the time domain location corresponding to the WUS is the second location, and the all-wake-up signal corresponding to all groups is the common WUS. In cases where the second location is different from the location of the legacy WUS and the number of groups is greater than the fifth threshold, a resource location of the WUS and the all-wake-up signal are determined at least according to the group corresponding to the terminal. Details have been described in exemplary embodiment 3, and are not repeated herein.

The fourth threshold and the fifth threshold are preset thresholds, or may be configured via higher-layer signalling.

Exemplary Embodiment 4

A terminal determines a first parameter corresponding to a WUS according to a threshold and a location parameter indicated via higher-layer signalling. The first parameter is embodied as a resource location of the WUS and the all-wake-up signal corresponding to a group to which the terminal belongs. A second location is determined according to the location parameter. The all-wake-up signal includes a first signal and a second signal, wherein the first signal is a legacy WUS, and the second signal is a common WUS. The terminal obtains a sixth threshold via higher-layer signalling, receives and detects a WUS at least according to the first parameter, and determines detection of a physical downlink control channel according to a detection result.

In cases where the second location is the same as the location of the legacy WUS, the resource location of the WUS is the first location, and the all-wake-up signal corresponding to all groups is the legacy WUS.

In cases where the second location is different from the location of the legacy WUS, and the group index is less than or equal to a configured sixth threshold, the resource location of the WUS is the second location, and the all-wake-up signal corresponding to all groups is the common WUS. In cases where the second location is different from the location of the legacy WUS, and the group index is greater than the sixth threshold, the resource location of the WUS is the first location, and the all-wake-up signal corresponding to all groups is the legacy WUS.

Exemplary Embodiment 5

A terminal determines, according to a location parameter and a group index set indicated via higher-layer signalling, a first parameter corresponding to a WUS. The first parameter is embodied as embodied as a resource location of the WUS and the all-wake-up signal corresponding to a group to which the terminal belongs. A second location is determined according to the location parameter. The all-wake-up signal includes a first signal and a second signal, wherein the first signal is a legacy WUS, and the second signal is a common WUS. The terminal obtains group index set information via higher-layer signalling, wherein the group index set information includes a first group of indices or a second group of indices, the first group of indices indicates groups of which the all-wake-up signal is the common WUS, and the second group of indices indicates groups of which the all-wake-up signal is the legacy WUS. The terminal receives and detects a WUS at least according to the first parameter, and determines detection of a physical downlink control channel according to a detection result.

Exemplary Implementation 1

The second location is different from the location of the legacy WUS, in cases where the first group of indices include a group index corresponding to a WUS, the resource location of the WUS is the second location, and the all-wake-up signal corresponding to the group is the common WUS; and in cases where the first group of indices does not include the group index corresponding to the WUS, the resource location of the WUS is the first location, and the all-wake-up signal corresponding to the WUS is the legacy WUS.

Example 1

It is assumed that there are four groups in total, the configured second location is different from the location of the legacy WUS, and the first group of indices is {1,3}. In this case, the resource locations of the WUSs corresponding to group 1 and group 3 are the second location, and the all-wake-up signal corresponding to group 1 and group 3 is the common WUS; the resource locations of the WUSs corresponding to group 2 and group 4 are the first location, and the all-wake-up signal corresponding to group 2 and group 4 is the legacy WUS.

Exemplary Implementation 2

The second location is different from the location of the legacy WUS, in cases where the second group of indices include a group index corresponding to a WUS, the resource location of the WUS is the first location, and the all-wake-up signal corresponding to the WUS is the legacy WUS; and in cases where the second group of indices does not include the group index corresponding to the WUS, the resource location of the WUS is the second location, and the all-wake-up signal corresponding to the WUS is the common WUS.

Example 1

It is assumed that there are four groups in total, the configured second location is different from the location of the legacy WUS, and the second group of indices is {1,3}. In this case, the resource locations of the WUSs corresponding to group 1 and group 3 are the first location, and the all-wake-up signal corresponding to group 1 and group 3 is the legacy WUS; the resource locations of the WUSs corresponding to group 2 and group 4 are the second location, and the all-wake-up signal corresponding to group 2 and group 4 is the common WUS.

Exemplary Embodiment 6

A terminal determines a first parameter corresponding to a WUS according to the number of groups and a group index set indicated via higher-layer signalling. The first parameter is embodied as a resource location of the WUS and the all-wake-up signal corresponding to a group to which the terminal belongs. The resource location of a legacy WUS is the first location, and a location adjacent to the first location is the second location. The all-wake-up signal includes a first signal and a second signal, wherein the first signal is a legacy WUS, and the second signal is a common WUS. The terminal obtains group index set information via higher-layer signalling, wherein the group index set information includes {a first group of indices, a second group of indices}, the first group of indices indicates groups of which the all-wake-up signal is the common WUS, and the second group of indices indicates groups of which the all-wake-up signal is the legacy WUS. The terminal receives and detects a WUS at least according to the first parameter, and determines detection of a physical downlink control channel according to a detection result.

Exemplary Implementation 1

The configured number of groups is greater than a seventh threshold, in cases where the first group of indices include a group index of a group to which the terminal belongs, the resource location of the WUS is the second location, and the corresponding all-wake-up signal is the common WUS; and in cases where the first group of indices does not include the group index of the group to which the terminal belongs, the resource location of the WUS is the first location, and the corresponding all-wake-up signal is the legacy WUS.

Exemplary Implementation 2

The configured number of groups is greater than a seventh threshold, in cases where the second group of indices do not include a group index corresponding to a WUS, the resource location of the WUS is the second location, and the all-wake-up signal corresponding to the WUS is the common WUS; and in cases where the second group of indices include a group index corresponding to a WUS, the resource location of the WUS is the first location, and the all-wake-up signal corresponding to the WUS is the legacy WUS.

The seventh threshold is a predetermined value, or is indicated via higher-layer signalling.

Exemplary Embodiment 7

A terminal determines a first parameter of a WUS according to multiplexing information indicated via higher-layer signalling. The first parameter is embodied as a resource location of a WUS and a corresponding all-wake-up signal. The resource location includes a first location and a second location, wherein the first location is a location of a legacy WUS, and the second location is a location adjacent to the legacy WUS. The all-wake-up signal includes a first signal and a second signal, wherein the first signal is the legacy WUS, and the second signal is the common WUS. The multiplexing information is represented by 2 bits. The multiplexing information being 00 represents a first multiplexing mode; the multiplexing information being 01 represents a second multiplexing mode; the multiplexing information being 10 represents a third multiplexing mode; and the multiplexing information being 11 represents a fourth multiplexing mode.

In the first multiplexing mode, the resource location of the WUS is the first location, and the all-wake-up signal corresponding to the WUS is the legacy WUS.

In the second multiplexing mode, the resource location and the all-wake-up signal of the WUS are determined at least according to the group corresponding to the terminal, which is specifically as described in exemplary embodiment 1 and is not repeated herein.

In the third multiplexing mode, the resource location of the WUS is the second location, and the all-wake-up signal corresponding to the WUS is the common WUS.

In the fourth multiplexing mode, the resource location of the WUS is the first location or the second location, and the all-wake-up signal corresponding to the WUS is the legacy WUS or the common WUS. The terminal receives and detects a WUS at least according to the first parameter, and determines detection of a physical downlink control channel according to a detection result.

Exemplary Implementation 1

If the higher-layer signalling received by the terminal is 00, then the multiplexing mode is the first multiplexing mode, thus the resource location of the WUS is the first location, and the corresponding all-wake-up signal is the legacy WUS.

If the higher-layer signalling received by the terminal is 01, then the multiplexing mode is the second multiplexing mode, thus the resource location of the WUS and the all-wake-up signal are determined at least according to the group corresponding to the terminal, which is specifically as described in exemplary embodiment 3, and will not be repeated here.

If the higher-layer signalling received by the terminal is 10, then the multiplexing mode is the third multiplexing mode, thus the resource location of the WUS is the second location, and the all-wake-up signal corresponding to the WUS is the common WUS.

If the higher-layer signalling received by the terminal is 11, then the multiplexing mode is the fourth multiplexing mode, thus the resource location of the WUS is the first location or the second location, and the all-wake-up signal corresponding to the WUS is the legacy WUS or the common WUS.

Exemplary Embodiment 8

A terminal determines, according to a location parameter and multiplexing information indicated via higher-layer signalling, a first parameter corresponding to a WUS. The first parameter is embodied as a resource location of the WUS and a corresponding all-wake-up signal. The location parameter indicates a second location. The all-wake-up signal includes a first signal and a second signal, wherein the first signal is a legacy WUS, and the second signal is a common WUS. The multiplexing information is represented by 1 bit. In cases where the second location indicated by the configured location parameter is the same as the first location corresponding to the legacy WUS, the multiplexing information being 0 represents a first multiplexing mode, and the multiplexing information being 1 represents a fourth multiplexing mode. In cases where the second location indicated by the configured location parameter is different from the second location corresponding to the legacy WUS, the multiplexing information being 0) represents a second multiplexing mode, and the multiplexing information being 1 represents a third multiplexing mode. The first multiplexing mode, the second multiplexing mode, the third multiplexing mode and the fourth multiplexing mode are specifically described in exemplary embodiment 7, and are not repeated herein. The terminal receives and detects the WUS at least according to the first parameter, and determines detection of a physical downlink control channel according to a detection result.

Exemplary Implementation 1

In cases where the second location indicated by the location parameter received by the terminal is the same as the resource location of the legacy WUS, if the received higher-layer signalling is 0, then the multiplexing mode is the first multiplexing mode in which the resource location of the WUS is the location of the legacy WUS, and the all-wake-up signal corresponding to the WUS is the legacy WUS.

In cases where the second location indicated by the location parameter received by the terminal is the same as the resource location of the legacy WUS, if the received higher-layer signalling is 1, then the multiplexing mode is the fourth multiplexing mode in which the resource location of the WUS is the location of the legacy WUS or the second location, and the all-wake-up signal corresponding to the WUS is the legacy WUS or the common WUS.

In cases where the second location indicated by the location parameter received by the terminal is different from the resource location of the legacy WUS, if the received higher-layer signalling is 0, then the multiplexing mode is the second multiplexing mode in which the resource location of the WUS and the all-wake-up signal are determined at least according to the group corresponding to the terminal, which is specifically as described in the exemplary embodiment 3, and will not be repeated herein.

In cases where the second location indicated by the location parameter received by the terminal is different from the first location of the legacy WUS, if the received higher-layer signalling is 1, then the multiplexing mode is the third multiplexing mode in which the location corresponding to the WUS is the second location, and the all-wake-up signal corresponding to the WUS is the common WUS.

Exemplary Embodiment 9

A terminal determines, according to multiplexing information and signal set information indicated via higher-layer signalling, a first parameter corresponding to a WUS. The first parameter is embodied as a resource location of the WUS and a corresponding all-wake-up signal. The resource location includes a first location and a second location, wherein the first location is a location of a legacy WUS, and the second location is a location adjacent to the legacy WUS. The all-wake-up signal includes a first signal and a second signal, wherein the first signal is the legacy WUS, and the second signal is the common WUS. The multiplexing information is represented by 2 bits. The multiplexing information being 00 represents a first multiplexing mode; the multiplexing information being 01 represents a second multiplexing mode; the multiplexing information being 10 represents a third multiplexing mode; the multiplexing information being 11 represents a fourth multiplexing mode. The signal set information is information of WUS of each group, including {common WUS, legacy WUS}, which is represented by 1 bit. The signal set information being 1 represents the common WUS; and the signal set information being 0 represents the legacy WUS.

In the first multiplexing mode, the resource location of the WUS is the first location, and the corresponding all-wake-up signal is the legacy WUS.

In the second multiplexing mode, the resource location of the WUS and the all-wake-up signal are determined according to a sequence configured via signalling. In cases where the sequence corresponding to a group configured via signalling is the common WUS, the all-wake-up signal corresponding to the group is the common WUS, and the resource location is the second location. In cases where the sequence corresponding to a group configured via signalling is the legacy WUS, the all-wake-up signal corresponding to the group is the legacy WUS, the resource location is the first location.

In the third multiplexing mode, the resource location of the WUS is the second location, and the corresponding all-wake-up signal is the common WUS.

In the fourth multiplexing mode, the resource location of the WUS is the first location or the second location, and the corresponding all-wake-up signal is the legacy WUS or the common WUS. The terminal receives and detects the WUS at least according to the first parameter, and determines detection of a physical downlink control channel according to a detection result.

Exemplary Implementation 1

In cases where the higher-layer signalling received by the terminal is 00, the multiplexing mode is the first multiplexing mode, the location corresponding to the WUS is the first location, and the all-wake-up signal corresponding to the WUS is the legacy WUS.

In cases where the higher-layer signalling received by the terminal is 01, the multiplexing mode is the second multiplexing mode, then the resource location of the WUS and the all-wake-up signal are determined according to a group configured via signalling. In cases where the sequence corresponding to the group configured via signalling is the common WUS, the all-wake-up signal corresponding to the group is the common WUS, and the resource location of the WUS is the second location. In cases where the sequence corresponding to the group configured via signalling is the legacy WUS, the all-wake-up signal corresponding to the group is the legacy WUS, and the resource location of the WUS is the first location.

In cases where the higher-layer signalling received by the terminal is 10, the multiplexing mode is the third multiplexing mode, then the location corresponding to the WUS is the second location, and the corresponding all-wake-up signal is the common WUS.

In cases where the higher-layer signalling received by the terminal is 11, the multiplexing mode is the fourth multiplexing mode, the resource location of the WUS is the first location or the second location, and the corresponding all-wake-up signal is the legacy WUS or the common WUS.

Exemplary Embodiment 10

A terminal determines a first parameter corresponding to a WUS according to a location parameter, multiplexing information and signal set information indicated via higher-layer signalling. The first parameter is embodied as a resource location of the WUS and a corresponding all-wake-up signal. The location parameter indicates a second location. The all-wake-up signal includes a first signal and a second signal, wherein the first signal is a legacy WUS, and the second signal is a common WUS. The multiplexing information is represented by 1 bit. In cases where the second location and the resource location of the legacy WUS are the same, the multiplexing mode being 0 represents a first multiplexing mode, and the multiplexing mode being 1 represents a fourth multiplexing mode. In cases where the second location and the resource location of the legacy WUS are different, the multiplexing mode being 0) represents a second multiplexing mode, and the multiplexing mode being 1 represents a third multiplexing mode. The first multiplexing mode, the second multiplexing mode, the third multiplexing mode and the fourth multiplexing mode are specifically described in exemplary embodiment 9, and are not repeated herein. The signal set information is information of WUS of each group, and includes {common WUS, legacy WUS}, which is represented by 1 bit. The signal set information being 1 represents the common WUS, and the signal set information being 0 represents the legacy WUS. A terminal receives and detects the WUS at least according to the first parameter, and determines detection of a physical downlink control channel according to a detection result.

Exemplary Implementation 1

In cases where the second location indicated by the location parameter received by the terminal is the same as the location of the legacy WUS, and the received higher-layer signalling is 0, then the multiplexing mode is a first multiplexing mode in which the location corresponding to the WUS is the location of the legacy WUS, and the all-wake-up signal corresponding to the WUS is the legacy WUS.

In cases where the second location indicated by the location parameter received by the terminal is the same as the location of the legacy WUS, and the received higher-layer signalling is 1, then the multiplexing mode is a fourth multiplexing mode in which the location corresponding to the WUS is the location of the legacy WUS or the second location, and the all-wake-up signal corresponding to the WUS is the legacy WUS or the common WUS.

In cases where the second location indicated by the location parameter received by the terminal is different from the location of the legacy WUS, and the received higher-layer signalling is 0, the multiplexing mode is a second multiplexing mode, which specifically is: if a sequence corresponding to a group configured via signalling is the common WUS, the all-wake-up signal corresponding to the group is the common WUS, and the corresponding location is the second location. In cases where a sequence corresponding to a group configured via signalling is the legacy WUS, the all-wake-up signal corresponding to the group is the legacy WUS, and the corresponding location is the first location.

In cases where the second location indicated by the location parameter received by the terminal is different from the first location corresponding to the legacy WUS, and the received higher-layer signalling is 1, the multiplexing mode is a third multiplexing mode in which the location corresponding to the WUS is the second location, and the all-wake-up signal corresponding to the WUS is the common WUS.

In the described exemplary embodiments, in addition to detecting a corresponding all-wake-up signal, a terminal also needs to detect a group WUS, or detect a group all-wake-up signal and a partial-wake-up signal. The terminal can be notified, by means of signalling, whether the terminal only detects the group WUS, or detects the group WUS and the partial-wake-up signal, or fixedly detects one of the group WUS and the partial-wake-up signal.

Exemplary Embodiment 11

A terminal determines a first parameter corresponding to a WUS according to signal set information, which is indicated via higher-layer signalling, corresponding to each group. The first parameter is embodied as a resource location of the WUS and a corresponding all-wake-up signal. The signal set information is information of WUS of each group. M types of WUS sets are preset, then each group uses log 2(M) bits for indication. It is assumed that for group 1, two types of WUS sets include a common WUS or a legacy WUS; for group 2, two types of WUS sets include a common WUS or the legacy WUS; for group 3, two types of WUS sets include a common WUS or the legacy WUS; and for group H, two types of WUS sets include a common WUS or the legacy WUS. Each group corresponds to a 1-bit indication, the value of the bit being 1 represents that the corresponding set includes a common WUS, and the value of the bit being 0) represents that the corresponding set includes a legacy WUS, vice versa. The terminal receives and detects the WUS at least according to the first parameter, and determines detection of a physical downlink control channel according to a detection result.

Exemplary Implementation 1

It is assumed that the number of groups is equal to 2. In cases where the signalling received by the terminal from the base station is 11:

for a terminal which belongs to a group identified by a group index 1, a signal to be detected is {WUS1, common WUS}, since the corresponding all-wake-up signal is a common WUS, the resource location of the WUS is the second location; and for a terminal which belongs to a group identified by a group index 2, a signal to be detected is {WUS2, common WUS}, since the corresponding all-wake-up signal is a common WUS, the resource location of the WUS is the second location.

In cases where the signalling received by the terminal from the base station is 10:

for a terminal which belongs to a group identified by a group index 1, a signal to be detected is {WUS1, common WUS}, since a corresponding all-wake-up signal is the common WUS, the resource location of the WUS is the second location; and for a terminal which belongs to a group identified by a group index 2, a signal to be detected is {WUS2, legacy WUS}, since a corresponding all-wake-up signal is the legacy WUS, the resource location of the WUS is the location of the legacy WUS.

In cases where the signalling received by the terminal from the base station is 01:

for a terminal which belongs to a group identified by a group index 1, a signal to be detected is {WUS1, legacy WUS}, since a corresponding all-wake-up signal is the common WUS, the resource location of the WUS is the location of the legacy WUS; and for a terminal which belongs to a group identified by a group index 2, a signal to be detected is {WUS2, common WUS}, since a corresponding all-wake-up signal is the common WUS, the resource location of the WUS is the second location.

In cases where the signalling received by the terminal from the base station is 00:

for a terminal which belongs to a group identified by a group index 1, a signal to be detected is {WUS1, legacy WUS}, since a corresponding all-wake-up signal is the common WUS, the resource location of the WUS is the location of the legacy WUS; and for a terminal which belongs to a group identified by a group index 2, a signal to be detected is {WUS2, legacy WUS}, since a corresponding all-wake-up signal is the common WUS, the resource location of the WUS is the legacy WUS.

Exemplary Embodiment 12

A terminal determines a first parameter corresponding to a WUS according to a sequence set index indicated via higher-layer signalling. The first parameter is embodied as a resource location of the WUS and a corresponding detection sequence. The sequence set index is an index corresponding to a subset in a preset sequence set. As shown in Table 2, a terminal receives and detects a WUS at least according to the first parameter, and determines detection of a physical downlink control channel according to a detection result.

TABLE 2

Taking three groups as an example:

| index | Group 1 | Group 2 | Group 3 |
|---|---|---|---|
| 0 | {sequence A, sequence X} | {sequence B, sequence X} | {sequence C, sequence X} |
| 1 | {sequence A, sequence D, sequence E, sequence X} | {sequence B, sequence D, sequence F, sequence X} | {sequence C, sequence E, sequence F, sequence X} |
| 2 | {sequence A, sequence D, sequence E, sequence Y} | {sequence B, sequence D, sequence F, sequence Y} | {sequence C, sequence E, sequence F, sequence Y} |
| 3 | {sequence A, sequence Y} | {sequence B, sequence Y} | {sequence C, sequence Y} |
| 4 | {sequence A, sequence Y} | {sequence B, sequence Y} | {sequence C, sequence X} |
| 5 | {sequence A, sequence Y} | {sequence B, sequence X} | {sequence C, sequence Y} |
| 6 | {sequence A, sequence X} | {sequence B, sequence Y} | {sequence C, sequence Y} |
| 7 | {sequence A, sequence X} | {sequence B, sequence X} | {sequence C, sequence Y} |
| 8 | {sequence A, sequence X} | {sequence B, sequence Y} | {sequence C, sequence X} |
| 9 | {sequence A, sequence Y} | {sequence B, sequence X} | {sequence C, sequence X} |

The preset sequence set may also be determined based on at least one of: a resource location, a multiplexing relationship, the number of groups, and the number of sequences.

The terminal receives an index of 9, and assuming that the group index of the terminal is 1, the detection sequence corresponding to the terminal is {sequence A, sequence Y}. Since the sequence Y is included, the location corresponding to the terminal is the second location.

Exemplary Embodiment 13

A terminal determines a first parameter corresponding to a WUS according to a location parameter and a sequence set index indicated via higher-layer signalling. The first parameter is embodied as a resource location of the WUS and a corresponding detection sequence. The sequence set index is an index corresponding to a subset in a preset sequence set. The terminal obtains a second location according to the location parameter. In cases where the second location is the same as the location of the legacy WUS, the preset sequence set is shown in Table 3; and in cases where the second location is different from the location of the legacy WUS, the preset sequence set is shown in Table 4. The terminal receives and detects the WUS at least according to the first parameter, and determines detection of a physical downlink control channel according to a detection result.

TABLE 3

Taking 3 groups as an example:

| Index | Group 1 | Group 2 | Group 3 |
|---|---|---|---|
| 0 | {sequence A, sequence X} | {sequence B, sequence X} | {sequence C, sequence X} |
| 1 | {sequence A, sequence D, sequence E, sequence X} | {sequence B, sequence D, sequence F, sequence X} | {sequence C, sequence E, sequence F, sequence X} |
| 2 | {sequence A, sequence D, sequence E, sequence Y} | {sequence B, sequence D, sequence F, sequence Y} | {sequence C, sequence E, sequence F, sequence Y} |
| 3 | {sequence A, sequence Y} | {sequence B, sequence Y} | {sequence C, sequence Y} |

TABLE 4

| | | | |
|---|---|---|---|
| 0 | {sequence A, sequence X} | {sequence B, sequence X} | {sequence C, sequence X} |
| 1 | {sequence A, sequence D, sequence E, sequence X} | {sequence B, sequence D, sequence F, sequence X} | {sequence C, sequence E, sequence F, sequence X} |
| 2 | {sequence A, sequence Y} | {sequence B, sequence Y} | {sequence C, sequence X} |
| 3 | {sequence A, sequence Y} | {sequence B, sequence X} | {sequence C, sequence Y} |
| 4 | {sequence A, sequence X} | {sequence B, sequence Y} | {sequence C, sequence Y} |
| 5 | {sequence A, sequence X} | {sequence B, sequence X} | {sequence C, sequence Y} |
| 6 | {sequence A, sequence X} | {sequence B, sequence Y} | {sequence C, sequence X} |
| 7 | {sequence A, sequence Y} | {sequence B, sequence X} | {sequence C, sequence X} |

Alternatively, the size of Table 4 may be the same as that of Table 3, and Table 4 in this case may be formed by arbitrarily selecting 4 rows from Table 4.

The preset sequence set is also determined based on at least one of: a resource location, a multiplexing relationship, the number of groups, and the number of sequences.

Embodiment 2

A method for sending a signal is provided In the embodiments, and the flow includes the following operations.

At S1, a base station configures indication information corresponding to a WUS via higher-layer signalling.

At S2, the base station sends the WUS at least according to the first parameter determined by the indication information.

Exemplary Embodiment 1

A base station configures indication information corresponding to a WUS, and sends a WUS at least according to the first parameter corresponding to the indication information. The indication information is the number of groups. The first parameter is embodied as a resource location of the WUS and a corresponding all-wake-up signal. The resource location includes a first location and a second location, wherein the first location is the location of a legacy WUS, and the second location is a location adjacent to the legacy WUS. The adjacent location includes an adjacent frequency domain location and/or an adjacent time domain location. The all-wake-up signal is a WUS through which all terminals are woken up to detect the PDCCH. The all-wake-up signal includes a first signal and a second signal, wherein the first signal is a legacy WUS, and the second signal is a common WUS.

Exemplary Implementation 1

In cases where the configured number of groups is less than a first threshold, the resource location of the WUS is the first location, and the corresponding all-wake-up signal is the first signal. In cases where the configured number of groups is greater than or equal to the first threshold, the resource location of the WUS is the second location, and the corresponding all-wake-up signal is the second signal.

Example 1

It is assumed that the first threshold is a preset value 4, and the number of groups indicated via the higher-layer signalling is 2. Since the number of groups is less than the first threshold, the resource location of the WUS corresponding to all groups is the first location, i.e., the location of the legacy WUS, and the corresponding all-wake-up signal is also the legacy WUS. Details are shown in Table 5:

TABLE 5

| First location | |
|---|---|
| Group 1 | WUS 1 |
| Group 2 | WUS 2 |
| All-wake-up signal for Group 1 and Group 2 | Legacy WUS |

WUS1 is a group WUS corresponding to group 1, and WUS2 is a group WUS corresponding to group 2. In cases where any terminal in group 1 needs to be woken up, the base station sends WUS1. In cases where any terminal in group 2 needs to be woken up, the base station sends WUS2. In cases where both group 1 and group 2 need to be woken up, the base station sends the legacy WUS.

Example 2

It is assumed that the first threshold is a preset value 4, and the configured number of groups is 4. Since the number of groups is greater than or equal to the first threshold, the resource location of the WUS corresponding to all groups is the second location, and the corresponding all-wake-up signal is the common WUS, An example is as shown in Table 6.

TABLE 6

| Second location | |
|---|---|
| Group 1 | WUS 1 |
| Group 2 | WUS2 |
| Group 3 | WUS 3 |
| Group 4 | WUS 4 |
| All-wake-up signal for Group 1 and Group 2 | common WUS |

WUS1 is a group WUS corresponding to group 1. WUS2 is a group WUS corresponding to group 2. WUS3 is a group WUS corresponding to group 3, and WUS4 is a group WUS corresponding to group 4.

An alternative example is as shown in Table 7.

TABLE 7

| Second location | |
|---|---|
| Group 1 | WUS 1 |
| Group 2 | WUS 2 |
| Group 3 | WUS 3 |
| Group 4 | WUS 4 |
| Groups 1 and 2 | WUS 5 |
| Groups 1 and 3 | WUS 6 |
| Groups 1 and 4 | WUS 7 |
| Groups 2 and 3 | WUS 8 |
| Groups 2 and 4 | WUS 9 |
| Groups 3 and 4 | WUS 10 |
| Group 1, Group 2, and Group 3 | WUS 11 |
| Group 1, Group 2 and Group 4 | WUS 12 |
| Group 2, Group 3 and Group 4 | WUS 13 |
| Group 1, Group 2, Group 3, Group 4 | common WUS |

WUS1 is a group WUS corresponding to group 1, WUS2 is a group WUS corresponding to group 2, WUS3 is a group WUS corresponding to group 3, WUS4 is a group WUS corresponding to group 4, and WUS5~WUS13 are partial-wake-up signals.

A still alternative example is as shown in Table 8.

TABLE 8

| Second location | |
|---|---|
| Group 1 | WUS 1 |
| Group 2 | WUS 2 |
| Group 3 | WUS 3 |
| Group 4 | WUS 4 |
| Groups 1 and 2 | WUS 5 |
| Groups 1 and 3 | WUS 6 |
| Groups 1 and 4 | WUS 7 |
| Groups 2 and 3 | WUS 8 |
| Groups 2 and 4 | WUS 9 |
| Groups 3 and 4 | WUS 10 |
| Group 1, Group 2, Group 3, Group 4 | common WUS |

WUS1 is a group WUS corresponding to group 1, WUS2 is a group WUS corresponding to group 2, WUS3 is a group WUS corresponding to group 3, WUS4 is a group WUS corresponding to group 4, and WUS5~WUS110 are partial-wake-up signals.

Exemplary Implementation 2

In cases where the configured number of groups is less than a second threshold, the resource location of the WUS is the first location, and the corresponding all-wake-up signal is the first signal. In cases where the number of groups is greater than or equal to the second threshold and less than a third threshold, the resource location of the WUS is the second location, and a corresponding all-wake-up signal is the second signal. In cases where the number of groups is greater than or equal to the third threshold, the resource location of the WUS and the all-wake-up signal are determined at least according to the group, that is, each group of WUS corresponds to different resource locations and different all-wake-up signals.

The operation that the resource location of the WUS and the all-wake-up signal are determined at least according to the group index may be implemented in the following manner: predefining a correspondence between the group index and the resource location, predefining a correspondence between the group index and the all-wake-up signal, and predefining a correspondence between the group index, the resource location and the all-wake-up signal.

Example 1: a correspondence between the group index and the resource location is predefined, For example, assuming that the configured number of groups is N, then the resource location of the WUS with a group index of 1, 2, . . . , N/2 is the first location, and the resource location of the WUS with a group index of N/2+1 . . . , N is the second location, and vice versa.

It is assumed that N is 4, the corresponding group indices are 0,1,2,3, WUS1 is a group WUS corresponding to a group with a group index of 1, WUS2 is a group WUS corresponding to a group with a group index of 2, WUS3 is a group WUS corresponding to a group with a group index of 3, and WUS4 is a group WUS corresponding to a group with a group index of 4.

TABLE 9

| Second location | First location |
|---|---|
| WUS3, WUS4 | WUS1, WUS2 |

Example 2: a correspondence between the group index and the resource location is predefined, For example, assuming that the configured number of groups is N, then the resource location of the WUS with a group index of an odd number is the first location, and the resource location of the WUS with a group index of an even number is the second location, and vice versa.

It is assumed that N is 4: the corresponding group indices are 0,1,2,3, WUS1 is a group WUS corresponding to a group with a group index of 1, WUS2 is a group WUS corresponding to a group with a group index of 2, WUS3 is a group WUS corresponding to a group with a group index of 3, and WUS4 is a group WUS corresponding to a group with a group index of 4.

TABLE 10

| Second location | First location |
|---|---|
| WUS2, WUS4 | WUS1, WUS3 |

Example 3: a correspondence between the group index and the resource location is predefined, For example, assuming that the configured number of groups is N, in cases where a PO index is an odd number, a resource location of the WUS with a group index of 1 . . . , N/2 is the first location, and a resource location of the WUS with a group index of N/2+1, . . . , N is the second location. In cases where the paging moment index is an even number, the resource location of the WUS with an odd group index is the first location, and the resource location of the WUS with an even group index is the second location.

It is assumed that N is 4: the corresponding group indices are 0,1,2,3, WUS1 is a group WUS corresponding to a group with a group index of 1, WUS2 is a group WUS corresponding to a group with a group index of 2, WUS3 is a group WUS corresponding to a group with a group index of 3, and WUS4 is a group WUS corresponding to a group with a group index of 4.

TABLE 11

| PO 2 | | PO3 | |
|---|---|---|---|
| Second location | First location | Second location | First location |
| WUS2, WUS4 | WUS1, WUS3 | WUS3, WUS4 | WUS1, WUS2 |

Example 4: a correspondence between the group index and the all-wake-up signal is predefined. For example, assuming that the configured number of groups is N, groups with group indices of 1, . . . , N/2 correspond to a legacy WUS, groups with group indices of N/2+1, . . . , N correspond to a common WUS, and vice versa.

Example 5: a correspondence between the group index and the all-wake-up signal is predefined. For example, assuming that the configured number of groups is N, a group with an odd group index corresponds to a legacy WUS, and a group with an even group index corresponds to a common WUS, and vice versa.

Example 6: a correspondence between the group index and the all-wake-up signal is predefined. For example, assuming that the configured number of groups is N, in cases where a paging index is an odd number, groups with group indices of 1 . . . , N/2 correspond to a legacy WUS, and groups with group indices of N/2+1, . . . , N correspond to a common WUS. In cases where the paging index is an even number, groups with odd group indices correspond to the legacy WUS, and groups with even group indices correspond to the common WUS.

Example 7: a correspondence between the group index, the resource location and the all-wake-up signal is predefined. Assuming that the configured number of groups is N, then the group index with an odd number corresponds to the first location and the legacy WUS, and the group index with an even number corresponds to the second location and the common WUS.

Assuming that N is 4: the corresponding group indices are 0,1,2,3, WUS1 is a group WUS corresponding to a group with a group index of 1, WUS2 is a group WUS corresponding to a group with a group index of 2, WUS3 is a group WUS corresponding to a group with a group index of 3, and WUS4 is a group WUS corresponding to a group with a group index of 4.

TABLE 12

| Second location | | First location | |
|---|---|---|---|
| Group 2 | WUS 2 | Group 1 | WUS 1 |
| Group 4 | WUS 4 | Group 3 | WUS 3 |
| Groups 2 and 4 | Common WUS | Groups 1 and 3 | Legacy WUS |

The above is only examples, and does not exclude other correspondence between the groups, the resource locations and the all-wake-up signal.

In the embodiments, the first threshold, the second threshold, and the third threshold are preset thresholds, or may be values configured by the base station.

The first location is obtained according to the related art, and is not repeated herein.

Exemplary Embodiment 2

A base station configures indication information corresponding to a WUS, and sends a WUS at least according to the first parameter corresponding to the indication information. The indication information is a location parameter, and the first parameter is embodied as a resource location of the WUS and a corresponding all-wake-up signal. The location parameter indicates a second location. The all-wake-up signal includes a first signal and a second signal, wherein the first signal is a legacy WUS, and the second signal is a common WUS.

Exemplary Implementation 1

In cases where the second location and the location of the legacy WUS are the same, the all-wake-up signal corresponding to the WUS is the common WUS. In cases where the second location and the location of the legacy WUS are different, the location corresponding to the WUS is the second location, and the corresponding all-wake-up signal is the common WUS.

Exemplary Implementation 2

In cases where the second location and the location of the legacy WUS are the same, the all-wake-up signal corresponding to the WUS is the common WUS. In cases where the second location and the location of the legacy WUS are different, the resource location of the WUS and the all-wake-up signal are determined at least according to the group corresponding to the terminal.

Exemplary Embodiment 3

A base station configures indication information corresponding to a WUS, and sends a WUS at least according to the first parameter corresponding to the indication information. The indication information is a location parameter and the number of groups, and the first parameter is embodied as a resource location of the WUS and a corresponding all-wake-up signal. A second location is determined according to the location parameter. The all-wake-up signal includes a first signal and a second signal, wherein the first signal is a legacy WUS, and the second signal is a common WUS.

Exemplary Implementation 1

The second location is the same as the location of the legacy WUS, and the all-wake-up signal corresponding to the WUS is the legacy WUS.

Exemplary Implementation 2

In cases where the location of the second location is the same as the location of the legacy WUS and the number of groups is less than a fourth threshold, the corresponding all-wake-up signal is the legacy WUS. In cases where the location of the second location is the same as the location of the legacy WUS and the number of groups is greater than or equal to the fourth threshold, the corresponding all-wake-up signal is the common WUS.

Exemplary Implementation 3

In cases where the second location is different from the location of the legacy WUS, and the number of groups is less than or equal to a fifth threshold, the resource location of the WUS is the second location, and the corresponding all-wake-up signal is the common WUS. In cases where the second location and the location of the legacy WUS are different, and the number of groups is greater than the fifth threshold, the resource location of the WUS and the all-wake-up signal are determined at least according to the group corresponding to the terminal. Details are as described in exemplary embodiment 1, and are not repeated herein.

The fourth threshold and the fifth threshold are predetermined thresholds, or may be configured via higher-layer signalling.

Exemplary Embodiment 4

A base station configures indication information corresponding to a WUS, and sends a WUS at least according to the first parameter corresponding to the indication information. The indication information is a location parameter and a sixth threshold, and the first parameter is embodied as a resource location of the WUS and a corresponding all-wake-up signal. A second location is determined according to the location parameter. The all-wake-up signal includes a first signal and a second signal, wherein the first signal is a legacy WUS, and the second signal is a common WUS.

Exemplary Implementation 1

In cases where the second location is the same as the location of the legacy WUS, the resource location of the WUS is the first location, and the all-wake-up signal corresponding to the WUS is the legacy WUS.

In cases where the second location is different from the location of the legacy WUS, the group index is less than or equal to the configured sixth threshold, the time domain location corresponding to the WUS is the second location, and the all-wake-up signal corresponding to the WUS is the common WUS. In cases where the group index is greater than the sixth threshold, the resource location of the WUS is the first location, and the corresponding all-wake-up signal is the legacy WUS.

Example 1: it is assumed that the sixth threshold is 4, the configured number of groups is 4, and all group indices are less than the threshold; therefore, the time domain location corresponding to the WUS is the second location, and the corresponding all-wake-up signal is the common WUS, which specifically is shown in Table 13.

TABLE 13

| Second location | |
| --- | --- |
| Group 1 | WUS 1 |
| Group 2 | WUS 2 |
| Group 3 | WUS 3 |
| Group 4 | WUS 4 |
| Groups 1 and 2 | WUS 5 |
| Groups 1 and 3 | WUS 6 |
| Groups 1 and 4 | WUS 7 |
| Groups 2 and 3 | WUS 8 |
| Groups 2 and 4 | WUS 9 |
| Groups 3 and 4 | WUS 10 |
| Group 1, Group 2, Group 3, Group 4 | common WUS |

WUS1 is a group WUS corresponding to group 1, WUS2 is a group WUS corresponding to group 2, WUS3 is a group WUS corresponding to group 3, WUS4 is a group WUS corresponding to group 4, and WUS5~WUS10 are partial-wake-up signals.

Example 2: assuming that the sixth threshold is 2, and the configured number of groups is 4, the time domain location of the WUS corresponding to the group indices 1 and 2 is the second location, the corresponding all-wake-up signal is the common WUS; the time domain location of the WUS corresponding to the group indices 3 and 4 is the location of the legacy WUS, and the corresponding all-wake-up signal is the legacy WUS.

WUS1 is a group WUS corresponding to a group with a group index of 1, WUS2 is a group WUS corresponding to a group with a group index of 2, WUS3 is a group WUS corresponding to a group with a group index of 3, and WUS4 is a group WUS corresponding to a group with a group index of 4.

TABLE 14

| Second location | | First location | |
| --- | --- | --- | --- |
| Group 2 | WUS 2 | Group 1 | WUS 1 |
| Group 4 | WUS 4 | Group 3 | WUS 3 |
| Groups 2 and 4 | Common WUS | Groups 1 and 3 | Legacy WUS |

Exemplary Embodiment 5

A base station configures indication information corresponding to a WUS, and sends a WUS at least according to the first parameter corresponding to the indication information. The indication information is a location parameter and a group index set, and the first parameter is embodied as the resource location of the WUS and a corresponding all-wake-up signal. A second location is determined according to the location parameter. The all-wake-up signal includes a first signal and a second signal, wherein the first signal is a legacy WUS, and the second signal is a common WUS. The group index set includes {a first group of indices, a second group of indices}, wherein the first group of indices indicate groups of which the all-wake-up signal is the common WUS; or the second group of indices indicate groups of which the all-wake-up signal is the legacy WUS.

Exemplary Implementation 1

The second location is different from the location of the legacy WUS, in cases where the first group of indices include a group index corresponding to a WUS, the resource location of the WUS is the second location, and the corresponding all-wake-up signal is a common WUS; and in cases where the first group of indices does not include the group index corresponding to the WUS, the resource location of the WUS is the first location, and the corresponding all-wake-up signal is a legacy WUS.

Exemplary Implementation 2

The second location is different from the location of the legacy WUS, in cases where the second group of indices include a group index corresponding to the WUS, the resource location of the WUS is the first location, and the corresponding all-wake-up signal is the legacy WUS; and in cases where the second group of indices does not include the group index corresponding to the WUS, the resource location of the WUS is the second location, and the corresponding all-wake-up signal is the common WUS.

Exemplary Embodiment 6

A base station configures indication information corresponding to a WUS, and sends a WUS at least according to the first parameter corresponding to the indication information. The indication information is the number of groups and a group index set, and the first parameter is embodied as a resource location of the WUS and a corresponding all-wake-up signal. The location of the legacy WUS is a first location, and the location adjacent to the legacy WUS is a second location. The all-wake-up signal includes a first signal and a second signal, wherein the first signal is the legacy WUS, and the second signal is a common WUS. The group index set includes {a first group of indices, a second group of indices}, wherein the first group of indices indicate groups of which the all-wake-up signal is the common WUS, and the second group of indices indicates groups of which the all-wake-up signal is the legacy WUS.

Exemplary Implementation 1

The configured number of groups is greater than a seventh threshold, in cases where the first group of indices include a group index corresponding to a WUS, the resource location of the WUS is the second location, and the corresponding all-wake-up signal is a common WUS; and in cases where the first group of indices does not include the group index corresponding to the WUS, the resource location of the WUS is the first location, and the corresponding all-wake-up signal is a legacy WUS.

Exemplary Implementation 2

The configured number of groups is greater than a seventh threshold, in cases where the second group of indices do not include a group index corresponding to a WUS, the resource location of the WUS is the second location, and the corresponding all-wake-up signal is a common WUS; and in cases where the second group of indices include a group index corresponding to a WUS, the resource location of the WUS is the first location, and the corresponding all-wake-up signal is a legacy WUS:

The seventh threshold is a predetermined value, or is configured via higher-layer signalling.

Exemplary Embodiment 7

A base station configures indication information corresponding to a WUS, and sends a WUS at least according to the first parameter corresponding to the indication information. The indication information is multiplexing information, and the first parameter is embodied as a resource location of the WUS and a corresponding all-wake-up signal. The resource location includes a first location and a second location, wherein the first location is a location of a legacy WUS, and the second location is a location adjacent to the legacy WUS. The all-wake-up signal includes a first signal and a second signal, wherein the first signal is a legacy WUS, and the second signal is a common WUS. The multiplexing information includes four types of multiplexing mode indications which are represented by 2 bits, the multiplexing information being 00 represents a first multiplexing mode, the multiplexing information being 01 represents a second multiplexing mode, the multiplexing information being 10 represents a third multiplexing mode, and the multiplexing information being 11 represents a fourth multiplexing mode.

The first multiplexing mode is a mode in which the resource location of the WUS is the first location, and the corresponding all-wake-up signal is a legacy WUS.

The second multiplexing mode is a mode in which the resource location of the WUS and the all-wake-up signal are determined at least according to a group index, which is specifically described in exemplary embodiment 1, and is not repeated herein.

The third multiplexing mode is a mode in which the resource location of the WUS is the second location, and the corresponding all-wake-up signal is a common WUS.

The fourth multiplexing mode is a mode in which the resource location of the WUS is the first location or the second location, and the corresponding all-wake-up signal is a legacy WUS or a common WUS.

Example 1

The multiplexing information is 00, which represents that the multiplexing mode is the first multiplexing mode in which the resource location of the WUS is the first location, and the corresponding all-wake-up signal is the legacy WUS.

Example 2

The multiplexing information is 01, which represents that the multiplexing mode is the second multiplexing mode in which the resource location of the WUS and the all-wake-up signal are determined at least according to a group index corresponding to the terminal. The determination of the resource location of the WUS and the all-wake-up signal at least according to a group index corresponding to the terminal is specifically as described in exemplary embodiment 1, and will not be repeated here.

Example 3

The multiplexing information is 10, which represents that the multiplexing mode is the third multiplexing mode in which the resource location of the WUS is the second location, and the corresponding all-wake-up signal is a common WUS.

Example 4

The multiplexing information is 11, which represents that the multiplexing mode is the fourth multiplexing mode in which the resource location of the WUS is the first location or the second location, and the corresponding all-wake-up signal is a legacy WUS or a common WUS.

Exemplary Embodiment 8

A base station configures indication information corresponding to a WUS, and sends a WUS at least according to the first parameter corresponding to the indication information. The indication information is multiplexing information and a location parameter, and the first parameter is embodied as a resource location of the WUS and a corresponding all-wake-up signal. The location parameter indicates a second location. The all-wake-up signal includes a first signal and a second signal, wherein the first signal is a legacy WUS, and the second signal is a common WUS. In cases where the second location indicated by the configured location parameter is the same as the first location corresponding to the legacy WUS, the multiplexing information includes two types of multiplexing modes, which are represented by 1 bit. The multiplexing information being 0 represents a first multiplexing mode, and the multiplexing information being 1 represents a fourth multiplexing mode. In cases where the second location indicated by the configured location parameter is different from the second location corresponding to the legacy WUS, the multiplexing information includes two types of multiplexing modes, which are indicated by 1 bit. The multiplexing information being 0) represents a second multiplexing mode, and the multiplexing information being 1 represents a third multiplexing mode. The first multiplexing mode, the second multiplexing mode, the third multiplexing mode and the fourth multiplexing mode are specifically described in the foregoing embodiments.

Exemplary Implementation 1

In cases where the second location indicated by the location parameter is the same as the resource location of the legacy WUS, and the signalling is 0, the multiplexing mode is the first multiplexing mode, in which the second location is the location of the legacy WUS, and the corresponding all-wake-up signal is the legacy WUS.

Exemplary Implementation 2

In cases where the second location indicated by the location parameter is the same as the resource location of the legacy WUS, and the signalling is 1, the multiplexing mode is the fourth multiplexing mode, in which the resource location of the WUS is the resource location of the legacy WUS or the second location, and the corresponding all-wake-up signal is a legacy WUS or a common WUS.

Exemplary Implementation 3

In cases where a second location indicated by the location parameter is different from a resource location of the legacy WUS, and the signalling is 0, the multiplexing mode is the second multiplexing mode, in which the resource location of the WUS and the all-wake-up signal are determined at least according to the group, which is specifically described in exemplary embodiment 1, and is not repeated herein.

Exemplary Implementation 4

In cases where the second location indicated by the location parameter is different from the resource location of the legacy WUS, and the signalling is 1, the multiplexing mode is the third multiplexing mode, in which the resource location of the WUS is the second location, and the corresponding all-wake-up signal is a common WUS.

Exemplary Embodiment 9

A base station configures indication information corresponding to a WUS, and sends a WUS at least according to the first parameter corresponding to the indication information. The indication information is a multiplexing mode and signal set information, and the first parameter is embodied as a resource location of the WUS and a corresponding all-wake-up signal. The resource location includes a first location and a second location, wherein the first location is a resource location of a legacy WUS, and the second location is a location adjacent to the legacy WUS. The all-wake-up signal includes a first signal and a second signal, wherein the first signal is the legacy WUS, and the second signal is a common WUS. There are four multiplexing modes which are indicated by 2 bits, wherein the higher-layer signalling being 00 represents a first multiplexing mode, the higher-layer signalling being 01 represents a second multiplexing mode, the higher-layer signalling being 10 represents a third multiplexing mode, and the higher-layer signalling being 11 represents a fourth multiplexing mode. The signal set information is information of WUS corresponding to each group, and includes {common WUS, legacy WUS}, each group being represented by 1 bit.

In the first multiplexing mode, the resource location of the WUS is the first location, and the corresponding all-wake-up signal is a legacy WUS.

In the second multiplexing mode, the resource location of the WUS and the all-wake-up signal are determined according to the signal set information configured via the signalling. In cases where a signal corresponding to a group configured via signalling is a common WUS, the all-wake-up signal corresponding to the group is the common WUS, and the resource location of the WUS is the second location. In cases where a signal corresponding to a group configured via signalling is a legacy WUS, the all-wake-up signal corresponding to the group is the legacy WUS, and the resource location of the WUS is the first location.

In the third multiplexing mode, the resource location of the WUS is the second location, and a corresponding all-wake-up signal is a common WUS.

In the fourth multiplexing mode, the resource location of the WUS is the first location or the second location, and the corresponding all-wake-up signal is a legacy WUS or a common WUS.

Example 1

In cases where the higher-layer signalling is 00, the multiplexing mode is the first multiplexing mode, in which resource location of the WUS is the first location, and the corresponding all-wake-up signal is the legacy WUS.

Example 2

In cases where the higher-layer signalling is 01, the multiplexing mode is the second multiplexing mode, in which the resource location of the WUS and the all-wake-up signal are determined according to signal set information corresponding to each group. In cases where a signal corresponding to a group configured via signalling is a common WUS, the all-wake-up signal corresponding to the group is the common WUS, and the corresponding location is the second location; and in cases where a signal corresponding to a group configured via signalling is the legacy WUS, the all-wake-up signal corresponding to the group is the legacy WUS, and the corresponding location is the first location.

Example 3

In cases where the higher-layer signalling is 10, the multiplexing mode is the third multiplexing mode, in which the location corresponding to the WUS is the second location, and the all-wake-up signal corresponding to the WUS is the common WUS.

Example 4

In cases where the higher-layer signalling is 11, the multiplexing mode is the fourth multiplexing mode, in which the location corresponding to the WUS is the first location or the second location, and the all-wake-up signal corresponding to the WUS is a legacy WUS or a common WUS.

Exemplary Embodiment 10

A base station configures indication information corresponding to a WUS, and sends a WUS at least according to the first parameter corresponding to the indication information. The indication information is multiplexing information, sequence set information and a location parameter. The first parameter is embodied as an all-wake-up signal corresponding to the resource location of the WUS. The location parameter indicates a second location. The all-wake-up signal includes a first signal and a second signal, wherein the first signal is a legacy WUS, and the second signal is a common WUS. In cases where the second location indicated by the configured location parameter is the same as the first location corresponding to the legacy WUS, the multiplexing information includes two types of multiplexing modes and is represented by 1 bit. The multiplexing information being 0 represents a first multiplexing mode, and the multiplexing information being 1 represents a fourth multiplexing mode. In cases where the second location indicated by the configured location parameter is different from the second location corresponding to the legacy WUS, the multiplexing information includes two multiplexing modes and is represented by 1 bit. The multiplexing information being 0 represents a second multiplexing mode, and the multiplexing information being 1 represents a third multiplexing mode. The first multiplexing mode, the second multiplexing mode, the third multiplexing mode and the fourth multiplexing mode are specifically described in exemplary embodiment 9, and are not repeated herein.

Example 1

In cases where the second location indicated by the location parameter is the same as the location of the legacy WUS and the signalling is 0, the multiplexing mode is the first multiplexing mode, in which the location corresponding to the WUS is the location of the legacy WUS, and the all-wake-up signal corresponding to the WUS is the legacy WUS.

Example 2

In cases where the second location indicated by the location parameter is the same as the location of the legacy WUS, and the signalling is 1, the multiplexing mode is the fourth multiplexing mode, in which the location corresponding to the WUS is the location of the legacy WUS or the second location, and the all-wake-up signal corresponding to the WUS is a legacy WUS or a common WUS.

Example 3

In cases where the second location indicated by the location parameter is different from the location of the legacy WUS and the signalling is 0, the multiplexing mode is the second multiplexing mode, which specifically is: in cases where a signal configured via signalling includes a common WUS, the all-wake-up signal corresponding to the group is the common WUS, and the corresponding location is the second location; and in cases where the signal configured via signalling includes the legacy WUS, the all-wake-up signal corresponding to the group is the legacy WUS, and the corresponding location is the first location.

Example 4

In cases where the second location indicated by the location parameter is different from the first location corresponding to the legacy WUS and the signalling is 1, the multiplexing mode is the third multiplexing mode, in which the location corresponding to the WUS is the second location, and the all-wake-up signal corresponding to the WUS is a common WUS.

Exemplary Embodiment 11

A base station configures indication information corresponding to a WUS, and sends a WUS at least according to the first parameter corresponding to the indication information. The indication information is signal set information, and the first parameter is embodied as the resource location of the WUS, and a corresponding all-wake-up signal. Specifically, M types of signal sets are preset, and then each group uses log 2(M) bits for indication. It is assumed that for group 1, two types of preset WUS sets are {WUS1, common WUS}, {WUS1, legacy WUS}; for group 2, two types of preset WUS sets are {WUS2, common WUS}, {WUS2, the legacy WUS}; for group 3, two types of preset WUS sets are {WUS3, common WUS}, {WUS3, the legacy WUS}; for the group H, two types of preset WUS sets are {WUS H, common WUS}, {WUS H, legacy WUS}. Each group corresponds to a 1-bit indication, representing that the corresponding set is {WUS H, common WUS} when the value of the 1-bit indication is 1, and representing that the corresponding set is {WUS H, legacy WUS} when the value of the 1-bit indication is 0, vice versa. The WUS H is a group WUS corresponding to the group H.

Example 1

It is assumed the number of groups is equal to 2, in cases where the signalling is 11:

for group 1, a signal needing to be sent is {WUS1, common WUS}, since the corresponding all-wake-up signal is a common WUS, the resource location of the WUS is the second location; and for group 2, a signal needing to be sent is {WUS2, common WUS}, since the corresponding all-wake-up signal is a common WUS, the resource location of the WUS is the second location.

In cases where the signalling is 10:
for group 1, a signal needing to be sent is {WUS1, common WUS}, since the corresponding all-wake-up signal is a common WUS, the resource location of the WUS is the second location; and for group 2, a signal needing to be sent is {WUS2, a legacy WUS}, since the corresponding all-wake-up signal is a legacy WUS, the resource location of the WUS is a location of the legacy WUS.

In cases where the signalling is 01:
for group 1, a signal needing to be sent is {WUS1, a legacy WUS}, since the corresponding all-wake-up signal is a common WUS, the resource location of the WUS is the location of the legacy WUS; and for group 2, a signal needing to be sent is {WUS2, common WUS}; since the corresponding all-wake-up signal is a common WUS, the resource location of the WUS is the second location.

In cases where the signalling is 00:
for group 1, a signal needing to be sent is {WUS1, a legacy WUS}, since the corresponding all-wake-up signal is a common WUS, the resource location of the WUS is a location of the legacy WUS; and for group 2, a signal needing to be sent is {WUS2, a legacy WUS}, since the corresponding all-wake-up signal is a common WUS, the resource location of the WUS is a legacy WUS.

Exemplary Embodiment 12

A base station configures indication information corresponding to a WUS, and sends a WUS at least according to the first parameter corresponding to the indication information. The indication information is a sequence set index, and the first parameter is embodied as the resource location of the WUS and a corresponding sending sequence. The sequence set index is an index corresponding to a subset in a preset sequence set.

Example 1

Table 15 takes three groups as an example.

TABLE 15

| index | Group 1 | Group 2 | Group 3 |
|---|---|---|---|
| 0 | {sequence A, sequence X} | {sequence B, sequence X} | {sequence C, sequence X} |
| 1 | {sequence A, sequence D, sequence E, sequence X} | {sequence B, sequence D, sequence F, sequence X} | {sequence C, sequence E, sequence F, sequence X} |
| 2 | {sequence A, sequence D, sequence E, sequence Y} | {sequence B, sequence D, sequence F, sequence Y} | {sequence C, sequence E, sequence F, sequence Y} |
| 3 | {sequence A, sequence Y} | {sequence B, sequence Y} | {sequence C, sequence Y} |
| 4 | {sequence A, sequence Y} | {sequence B, sequence Y} | {sequence C, sequence X} |
| 5 | {sequence A, sequence Y} | {sequence B, sequence X} | {sequence C, sequence Y} |
| 6 | {sequence A, sequence X} | {sequence B, sequence Y} | {sequence C, sequence Y} |
| 7 | {sequence A, sequence X | {sequence B, sequence X} | {sequence C, sequence Y} |
| 8 | {sequence A, sequence X} | {sequence B, sequence Y} | {sequence C, sequence X} |
| 9 | {sequence A, sequence Y} | {sequence B, sequence X} | {sequence C, sequence X} |

Assuming that the sequence set index indicated by the base station is 9, then the sequence corresponding to group 1 is {sequence A, sequence Y}, the sequence corresponding to group 2 is {sequence B, sequence X}, and the sequence corresponding to group 3 is {sequence C, sequence X}. The preset sequence set may also be determined based on at least one of: a resource location, a multiplexing relationship, the number of groups, and the number of sequences.

The meanings of the sequences are as follows.

TABLE 16

| WUS | Sequences |
|---|---|
| WUS 1 | Sequence A |
| WUS 2 | Sequence B |
| WUS 3 | Sequence C |

TABLE 16-continued

| WUS | Sequences |
| --- | --- |
| WUS 1 and WUS 2 | Sequence D |
| WUS 1 and WUS 3 | Sequence E |
| WUS 2 and WUS 3 | Sequence F |
| Common WUS | Sequence X |
| Legacy WUS | Sequence Y |

Exemplary Embodiment 13

A base station configures indication information corresponding to a WUS, and sends a WUS at least according to the first parameter corresponding to the indication information. The indication information is sequence set index information and a location parameter. The first parameter is a resource location of the WUS and a corresponding sequence. The sequence set index is an index of a subset in a preset set. The terminal obtains a second location according to the location parameter. In cases where the second location is the same as the location of the legacy WUS, the preset sequence set is as shown in Table 17. In cases where the second location is different from the location of the legacy WUS, the preset sequence set is as shown in Table 18.

Exemplary embodiment 1, the presence of three groups is taken as an example.

TABLE 17

| Index | Group 1 | Group 2 | Group 3 |
| --- | --- | --- | --- |
| 0 | {sequence A, sequence X} | {sequence B, sequence X} | {sequence C, sequence X} |
| 1 | {sequence A, sequence D, sequence E, sequence X} | {sequence B, sequence D, sequence F, sequence X} | {sequence C, sequence E, sequence F, sequence X} |
| 2 | {sequence A, sequence D, sequence E, sequence Y} | {sequence B, sequence D, sequence F, sequence Y} | {sequence C, sequence E, sequence F, sequence Y} |
| 3 | {sequence A, sequence Y} | {sequence B, sequence Y} | {sequence C, sequence Y} |

TABLE 18

| 0 | {sequence A, sequence X} | {sequence B, sequence X} | {sequence C, sequence X} |
| --- | --- | --- | --- |
| 1 | {sequence A, sequence D, sequence E, sequence X} | {sequence B, sequence D, sequence F, sequence X} | {sequence C, sequence E, sequence F, sequence X} |
| 2 | {sequence A, sequence Y} | {sequence B, sequence Y} | {sequence C, sequence X} |
| 3 | {sequence A, sequence Y} | {sequence B, sequence X} | {sequence C, sequence Y} |
| 4 | {sequence A, sequence X} | {sequence B, sequence Y} | {sequence C, sequence Y} |
| 5 | {sequence A, sequence X} | {sequence B, sequence X} | {sequence C, sequence Y} |
| 6 | {sequence A, sequence X} | {sequence B, sequence Y} | {sequence C, sequence X} |
| 7 | {sequence A, sequence Y} | {sequence B, sequence X} | {sequence C, sequence X} |

Alternatively, the size of Table 18 may be the same as that of Table 17, and Table 18 in such a case may be formed by selecting any 4 rows from Table 18.

The preset sequence set may also be determined based on at least one of: a resource location, a multiplexing relationship, the number of groups, and the number of sequences.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

A device for sending a group WUS is provided in the embodiments. The device is used to implement the above embodiments and exemplary implementations, and the details having been described will not be repeated. As used below; the term "module" may implement a combination of software and/or hardware of a predetermined function. Although the device described in the following embodiments is preferably implemented in software, the implementation in hardware or a combination of software and hardware is also possible and contemplated.

Figure 4:
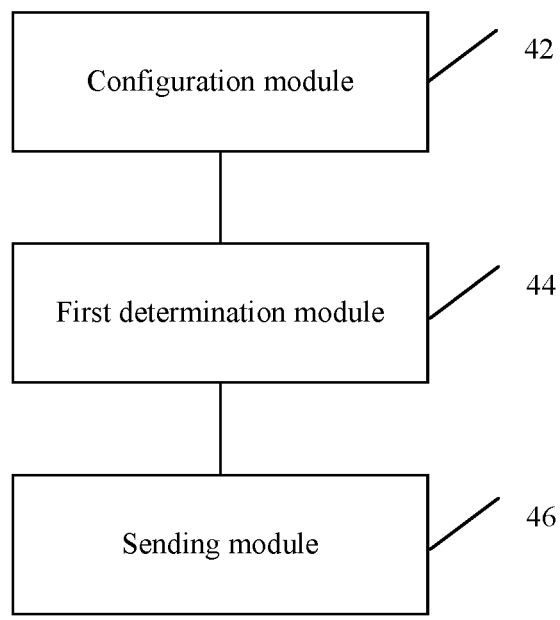
FIG. 4 is a structure diagram of a device for sending a group WUS according to some embodiments of the present disclosure.

FIG. 4 is a structural block diagram of a device for sending a group WUS according to some embodiments of the present disclosure. As shown in FIG. 4, the device includes: a configuration module 42, a first determination module 44 and a sending module 46. The device is described in detail below.

The configuration module 42 is configured to configure indication information corresponding to a group WUS via higher-layer signalling.

The first determination module 44 is configured to determine a first parameter according to the indication information.

The sending module 46 is configured to send the group WUS to a terminal according to the first parameter, wherein the group WUS is a WUS corresponding to a group of terminals.

In the embodiments, the indication information includes at least one of: the number of groups, a location parameter, multiplexing information, a threshold, signal set information, a group index set, and a sequence set index. The first parameter includes at least one of: a resource location corresponding to a group WUS, an all-wake-up signal corresponding to each group, and a sequence corresponding to the group WUS.

By means of the embodiments of the present disclosure, a base station configures indication information corresponding to a group WUS via higher-layer signalling, determines a first parameter according to the indication information, and sends the group WUS to a terminal according to the first parameter, wherein the group WUS is a WUS corresponding to a group of terminals. The indication information includes at least one of: the number of groups, a location parameter, multiplexing information, a threshold, signal set information, a group index set, and a sequence set index. The first parameter includes at least one of: a resource location corresponding to a group WUS, an all-wake-up signal corresponding to each group, and a sequence corresponding to the group WUS. After receiving the first parameter, the terminal receives the group WUS based on the first parameter, which can reduce the number of times that the terminal unnecessarily detects a PDCCH. Therefore, the problem in the related art that the power consumption of a terminal for detecting a PDCCH is relatively high can be solved, and the effect of reducing the terminal consumption can be achieved.

In some exemplary implementations, the resource location corresponding to the group WUS may include at least one of a first location and a second location. In the embodiments, the first location and the second location are resource locations of the group WUS.

In some exemplary implementations, the all-wake-up signal includes at least one of: a legacy WUS, and a common WUS. In the embodiments, the all-wake-up signal is a signal used for waking up all terminals corresponding to the all-wake-up signal to perform PDCCH detection, and the legacy WUS refers to a WUS in the related art.

In some exemplary implementations, in cases where the indication information includes the number of groups, the number of groups includes at least one of: the number of groups corresponding to the terminal at a PO corresponding to the group WUS; the number of terminal groups corresponding to the same time-frequency resource location; and the number of terminal groups corresponding to the same time domain resource location. In the embodiments, the number of groups is determined based on PO.

In some exemplary implementations, in cases where the indication information includes the location parameter, the location parameter may include at least one of: a first offset; a second offset; and a start physical resource block index of a second frequency domain location. The first offset includes one of: a time domain distance between an end location of a second location and a start location of a first location; a time domain distance between an end location of a second location and an end location of a first location; or a time domain distance between an end location of a second location and a start location of a search space of a physical downlink control channel. The second offset includes the number of physical resource blocks between the second frequency domain location and a first frequency domain location.

In some exemplary implementations, in cases where the indication information includes the multiplexing information, the multiplexing information indicates at least one of: a first multiplexing mode; a second multiplexing mode; a third multiplexing mode; and a fourth multiplexing mode. The first multiplexing mode is a multiplexing mode in which the resource location corresponding to the group WUS is a first location, and the all-wake-up signal is a legacy WUS; the second multiplexing mode is a multiplexing mode in which the resource location corresponding to the group WUS and the all-wake-up signal are determined based on a group index; the third multiplexing mode is a multiplexing mode in which the resource location corresponding to the group WUS is a second location, and the all-wake-up signal is a common WUS; and the fourth multiplexing mode is a multiplexing mode in which the resource location corresponding to the group WUS is a first location or a second location, and the all-wake-up signal is a legacy WUS or a common WUS.

In some exemplary implementations, in cases where the indication information includes the group index set, the group index set includes at least one of: a set of group indices corresponding to groups for which the corresponding all-wake-up signal is a common WUS; a set of group indices corresponding to groups for which the corresponding all-wake-up signal is a legacy WUS; a set of group indices corresponding to groups for which the corresponding resource location is a first location; and a set of group indices corresponding to groups for which the corresponding resource location is a second location.

In some exemplary implementations, in cases where the indication information includes the signal set information, the signal set information includes information of WUS of each group, or information of WUS of all groups, wherein the information of WUS of each group includes a common WUS or a legacy WUS, and the information of WUS of all groups includes a common WUS or a legacy WUS.

In some exemplary implementations, in cases where the indication information includes the sequence set index, the sequence set index includes an index corresponding to a subset in a preset sequence set. The preset sequence set is predefined, or the preset sequence set is determined based on at least one of: a resource location, a multiplexing relationship, the number of groups, and the number of sequences.

In some exemplary implementations, the operation that the base station determines the first parameter according to the indication information includes: in cases where the indication information includes the number of groups, the base station determines the first parameter at least according to the number of groups and a preset threshold.

In some exemplary implementations, the operation that the base station determines the first parameter according to the indication information includes: in cases where the indication information includes the location parameter, the base station determines the first parameter at least according to a second location determined by the location parameter and a location of a legacy WUS.

In some exemplary implementations, the operation that the base station determines the first parameter according to the indication information includes: in cases where the indication information includes the multiplexing parameter, the base station determines the first parameter at least according to a multiplexing mode included in the multiplexing information.

In some exemplary implementations, the operation that the base station determines the first parameter according to the indication information includes: in cases where the indication information includes the threshold, the base station determines the first parameter at least according to each group index and the threshold, or the base station determines the first parameter at least according to the number of groups and the threshold.

In some exemplary implementations, the operation that the base station determines the first parameter according to the indication information includes: in cases where the indication information includes the signal set information, the base station determines the first parameter at least according to a signal included in the signal set information.

In some exemplary implementations, the operation that the base station determines the first parameter according to the indication information includes: in cases where the indication information includes the group index set, the base station determines the first parameter at least according to group information indicated in the group index set.

In some exemplary implementations, the operation that the base station determines the first parameter according to the sequence set index includes: in cases where the indication information includes the sequence set index, the base station determines the first parameter at least according to a subset in the sequence set indicated by the sequence set index.

Figure 5:
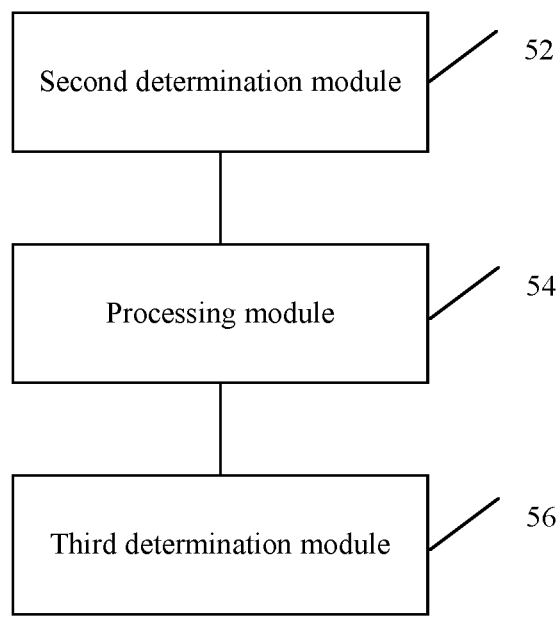
FIG. 5 is a structure diagram of a device for detecting a physical downlink control channel according to some embodiments of the present disclosure.

The embodiments provide a device for detecting a physical downlink control channel. FIG. 5 is a structure diagram of a device for detecting a physical downlink control channel according to some embodiments of the present disclosure. As shown in FIG. 5, the device includes: a second determination module 52, a processing module 54 and a third determination module 56. The device is described in detail below:

The second determination module 52 is configured to determine a first parameter of a group WUS according to indication information obtained via higher-layer signalling.

The processing module 54 is configured to receive and detect the group WUS according to the first parameter.

The third determination module 56 is configured to determine whether to detect a physical downlink control channel according to a detection result.

By means of the embodiments of the present disclosure, a terminal determines a first parameter of a group WUS according to indication information obtained via higher-layer signalling, then receives and detects the group WUS according to the first parameter, and determines whether to detect a physical downlink control channel according to a detection result. After receiving the first parameter, the terminal can receive the group WUS based on the first parameter, thereby reducing the number of times that the terminal unnecessarily detect the PDCCH. Therefore, the problem in the related art that the power consumption of a terminal for detecting a PDCCH is relatively high can be solved, thereby achieving the effect of reducing terminal consumption.

In some exemplary implementations, the resource location corresponding to the group WUS may include at least one of a first location and a second location.

In some exemplary implementations, the all-wake-up signal includes at least one of: a legacy WUS, and a common WUS. The all-wake-up signal is a signal used for waking up all terminals corresponding to the all-wake-up signal to perform PDCCH detection, and the legacy WUS refers to a WUS in the related art.

In some exemplary implementations, the operation that the terminal determines the first parameter of the group WUS according to the indication information obtained via the higher-layer signalling includes: in cases where the indication information includes the number of groups, the terminal determines the first parameter at least according to the number of groups and a preset threshold.

In some exemplary implementations, the operation that the terminal determines the first parameter of the group WUS according to the indication information obtained via the higher-layer signalling includes: in cases where the indication information includes the location parameter, the terminal determines the first parameter at least according to a second location determined by the location parameter and a resource location of a legacy WUS.

In some exemplary implementations, the second location is determined according to a first location and the location parameter, wherein the location parameter includes at least one of: a first offset, a second offset, and a start physical resource block index of a second frequency domain location. The first offset includes one of the following: a time domain distance between an end location of a second location and a start location of a first location, a time domain distance between an end location of a second location and an end location of a first location, or a time domain distance between an end location of a second location and a start location of a search space of a physical downlink control channel. The second offset includes the number of physical resource blocks between the second frequency domain location and a first frequency domain location.

In some exemplary implementations, in cases where the indication information includes the multiplexing information, the operation that the terminal determines the first parameter of the group WUS according to the indication information obtained via the higher-layer signalling includes: the terminal determines the first parameter at least according to a multiplexing mode included in the multiplexing information.

In some exemplary implementations, the multiplexing information may include at least one of: a first multiplexing mode; a second multiplexing mode; a third multiplexing mode; and a fourth multiplexing mode. The first multiplexing mode is a multiplexing mode in which the resource location corresponding to the group WUS is a first location, and the all-wake-up signal is a legacy WUS; the second multiplexing mode is a multiplexing mode in which resource location corresponding to the group WUS and the all-wake-up signal are determined based on a group index; the third multiplexing mode is a multiplexing mode in which the resource location corresponding to the group WUS is a second location, and the all-wake-up signal is a common WUS; and the fourth multiplexing mode is a multiplexing mode in which the resource location corresponding to the group WUS is a first location or a second location, and the all-wake-up signal is a legacy WUS or a common WUS.

In some exemplary implementations, the operation that the terminal determines the first parameter of the group WUS according to the indication information obtained via the higher-layer signalling includes: in cases where the indication information includes the threshold, the terminal determines the first parameter at least according to a group index corresponding to the terminal and the threshold, or the terminal determines the first parameter at least according to the number of groups and the threshold.

In some exemplary implementations, the operation that the terminal determines the first parameter of the group WUS according to the indication information obtained via the higher-layer signalling includes: in cases where the indication information includes the group index set, the terminal determines the first parameter at least according to a group index corresponding to the terminal and the group index set indicated by a base station.

In some exemplary implementations, the group index set includes at least one of: a set of group indices corresponding to groups for which the corresponding all-wake-up signal is a common WUS; a set of group indices corresponding to groups for which the corresponding all-wake-up signal is a legacy WUS; a set of group indices corresponding to groups for which the corresponding resource location is a first location; and a set of group indices corresponding to groups for which the corresponding resource location is a second location.

In some exemplary implementations, in cases where the indication information includes the signal set information, the operation that the terminal determines the first parameter of the group WUS according to the indication information obtained via the higher-layer signalling includes: the terminal determines the first parameter at least according to a signal included in the signal set information.

In some exemplary implementations, the signal set information is information of WUS of each group, or information of WUS of all groups, wherein the information of WUS of each group includes a common WUS or a legacy WUS, and the information of WUS of all groups includes a common WUS or a legacy WUS.

In some exemplary implementations, the operation that the terminal determines the first parameter of the group WUS according to the indication information obtained via the higher-layer signalling includes: in cases where the indication information includes the sequence set index, the terminal determines the first parameter at least according to a sequence set indicated by the sequence set index, wherein the sequence set index is an index corresponding to a subset in a preset sequence set.

In some exemplary implementations, the preset sequence set is a predefined sequence set, or the preset sequence set is determined based on at least one of: a resource location, a multiplexing relationship, the number of groups, and the number of sequences.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

The embodiments of the present disclosure provide a storage medium. The storage medium stores a computer program, wherein the computer program is configured to execute the operations in any one of the method embodiments at runtime.

In some exemplary implementations of the embodiments, the storage medium may be configured to store a computer program for executing each of the above operations.

In some exemplary implementations of the embodiments, the storage medium may include, but is not limited to, any medium that can store a computer program, such as a USB flash drive, a Read-Only Memory (ROM), a Random Access Memory (RAM), a removable hard disk, a magnetic disk, or an optical disc.

Some embodiments of the present disclosure provide an electronic device, including a memory and a processor, wherein the memory stores a computer program, and the processor is configured to run the computer program to execute the operations in any of the described method embodiments.

In some exemplary implementations, the electronic device may further include a transmitting device and an input/output device, wherein the transmitting device is connected to the processor, and the input/output device is connected to the processor.

In some exemplary implementations of the embodiments, the processor may be arranged to perform the above operations by a computer program.

Optionally, specific implementations for the present embodiment may refer to the examples described in the above embodiments and alternative implementations, and details are not repeated in the present embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A method for sending a group wake-up signal (WUS), comprising:
    configuring, by a base station, indication information corresponding to a group WUS via higher-layer signaling;
    determining, by the base station, a first parameter according to the indication information; and
    sending, by the base station, the group WUS to a terminal according to the first parameter, wherein the group WUS is a WUS corresponding to a group of terminals;
    wherein the indication information comprises: a number of groups, a location parameter, and multiplexing information;
    the first parameter comprises: a resource location corresponding to the group WUS, an all-wake-up signal corresponding to each group WUS, and a sequence corresponding to the group WUS,
    wherein the number of groups comprises: a number of terminal groups corresponding to a same time-frequency resource location;
    wherein the location parameter comprises: a first offset and a second offset;
    the multiplexing information comprises at least: a first multiplexing mode; and a fourth multiplexing mode; wherein the first multiplexing mode is a multiplexing mode in which the resource location corresponding to the group WUS is a first location, and the all-wake-up signal is a legacy WUS; the fourth multiplexing mode is a multiplexing mode in which the resource location corresponding to the group WUS is the first location, and the all-wake-up signal is a common WUS;
    wherein the resource location corresponding to the group WUS is a second location, and the all-wake-up signal is a common WUS.

2. The method according to claim 1, wherein determining, by the base station, the first parameter according to the indication information comprises:
    determining the first parameter at least according to the number of groups and a preset threshold;
    or,
    determining the first parameter at least according to the second location determined by the location parameter and a location of a legacy WUS;
    or,
    determining the first parameter at least according to a multiplexing mode indicated by the multiplexing information.

3. The method according to claim 1, the indication information further comprises at least one of: a group index set, a threshold, signal set information, and a sequence set index.

4. The method according to claim 3, wherein determining, by the base station, the first parameter according to the indication information comprises:
   determining the first parameter at least according to the second location determined by the location parameter and a location of a legacy WUS;
   or,
   determining the first parameter at least according to a group index in the group index set and a threshold, or determining the first parameter at least according to the number of groups and the threshold;
   or,
   determining the first parameter at least according to a signal comprised in the signal set information;
   or,
   determining the first parameter at least according to a sequence set indicated by the sequence set index.

5. A method for detecting a physical downlink control channel, comprising:
   determining, by a terminal, a first parameter of a group Wake-Up Signal (WUS) according to indication information obtained via higher-layer signaling;
   receiving and detecting, by the terminal, the group WUS according to the first parameter, wherein the group WUS is a WUS corresponding to a group of terminals; and
   determining, by the terminal, whether to detect a physical downlink control channel according to a detection result;
   wherein the indication information comprises: a number of groups, a location parameter, and multiplexing information;
   wherein the number of groups comprises: a number of terminal groups corresponding to a same time-frequency resource location;
   the first parameter comprises: a resource location corresponding to the group WUS, a corresponding all-wake-up signal, and a sequence corresponding to the group WUS,
   wherein the location parameter comprises: a first offset and a second offset;
   the multiplexing information comprises at least: a first multiplexing mode; and a fourth multiplexing mode; wherein the first multiplexing mode is a multiplexing mode in which the resource location corresponding to the group WUS is a first location, and the all-wake-up signal is a legacy WUS; the fourth multiplexing mode is a multiplexing mode in which the resource location corresponding to the group WUS is the first location, and the all-wake-up signal is a common WUS;
   wherein the resource location corresponding to the group WUS is a second location, and the all-wake-up signal is a common WUS.

6. The method according to claim 5, wherein determining, by the terminal, the first parameter of the group WUS according to the indication information obtained via the higher-layer signaling comprises:
   determining the first parameter at least according to the number of groups and a preset threshold.

7. The method according to claim 5, further comprising:
   the second location is determined according to the first location and the location parameter, wherein the location parameter comprises at least one of: the first offset, the second offset, and a start physical resource block index of a second frequency domain location;
   the first offset comprises one of the following: a time domain distance between an end location of the second location and a start location of the first location, a time domain distance between an end location of the second location and an end location of the first location, and a time domain distance between an end location of the second location and a start location of a search space of the physical downlink control channel;
   the second offset comprises a number of physical resource blocks between the second frequency domain location and a first frequency domain location.

8. The method according to claim 5, wherein determining, by the terminal, the first parameter of the group WUS according to the indication information obtained via the higher-layer signaling comprises:
   determining the first parameter at least according to a multiplexing mode corresponding to the multiplexing information.

9. The method according to claim 5, wherein determining, by the terminal, the first parameter of the group WUS according to the indication information obtained via the higher-layer signaling comprises:
   determining the first parameter at least according to a group index corresponding to the terminal and a group index set indicated by a base station.

10. The method according to claim 5, the indication information further comprises at least one of: a group index set, a threshold, signal set information, and a sequence set index.

11. The method according to claim 5, The method according to claim 5, wherein determining, by the terminal, the first parameter of the group WUS according to the indication information obtained via the higher-layer signaling comprises:
    determining the first parameter at least according to the second location determined by the location parameter and a resource location of a legacy WUS;
    or,
    determining the first parameter at least according to a group index corresponding to the terminal and a threshold, or determining the first parameter at least according to the threshold and the number of groups.

12. The method according to claim 5, wherein determining, by the terminal, the first parameter of the group WUS according to the indication information obtained via the higher-layer signaling comprises:
    determining the first parameter at least according to a signal comprised in a signal set information.

13. The method according to claim 12, wherein
    the signal set information comprises information of WUS of each group WUS, and the information of WUS of each group WUS comprises at least one of: a common WUS and a legacy WUS;
    or, the signal set information comprises information of WUS of all groups WUS, wherein the information of WUS of all groups WUS comprises at least one of: a common WUS and a legacy WUS.

14. The method according to claim 5, wherein determining, by the terminal, the first parameter of the group WUS according to the indication information obtained via the higher-layer signaling comprises:
    determining the first parameter at least according to a sequence set indicated by a sequence set index, wherein the sequence set index is an index corresponding to a subset in a preset sequence set.

15. The method according to claim 14, wherein the preset sequence set is a predefined sequence set, or the preset sequence set is determined based on at least one of: a resource location, a multiplexing relationship, the number of groups, and the number of sequences.

16. A device for sending a group Wake-Up Signal (WUS), comprising a memory storing instructions and a processor in communication with the memory, wherein the processor is configured to execute the instructions to:
configure indication information corresponding to a group WUS via higher-layer signaling;
determine a first parameter according to the indication information; and
send the group WUS to a terminal according to the first parameter, wherein the group WUS is a WUS corresponding to a group of terminals;
wherein the indication information comprises: a number of groups, a location parameter, and multiplexing information;
wherein the number of groups comprises: a number of terminal groups corresponding to a same time-frequency resource location;
the first parameter comprises: a resource location corresponding to the group WUS, an all-wake-up signal corresponding to each group WUS, and a sequence corresponding to the group WUS,
wherein the location parameter comprises: the first offset and the second offset;
the multiplexing information comprises at least: a first multiplexing mode; and a fourth multiplexing mode;
wherein the first multiplexing mode is a multiplexing mode in which the resource location corresponding to the group WUS is a first location, and the all-wake-up signal is a legacy WUS; the fourth multiplexing mode is a multiplexing mode in which the resource location corresponding to the group WUS is the first location, and the all-wake-up signal is a common WUS;
wherein the resource location corresponding to the group WUS is a second location, and the all-wake-up signal is a common WUS.

17. A device for detecting a physical downlink control channel, comprising a memory storing instructions and a processor in communication with the memory, wherein the processor is configured to execute the instructions to perform the method according to claim 5.

18. A non-transitory computer-readable storage medium, wherein the storage medium stores a computer program, the computer program is configured to execute the method according to claim 1 at runtime.

19. A non-transitory computer-readable storage medium, wherein the storage medium stores a computer program, the computer program is configured to execute the method according to claim 5 at runtime.

* * * * *